US00RE41885E

(19) United States
(12) Reissued Patent
Margolis

(10) Patent Number: US RE41,885 E
(45) **Date of Reissued Patent: *Oct. 26, 2010**

(54) METHOD FOR PRODUCING A DEHYDRATED WHOLE FOOD PRODUCT

(76) Inventor: Geoffrey Margolis, 12229 Falkirk La., Los Angeles, CA (US) 90049

( * ) Notice: This patent is subject to a terminal disclaimer.

(21) Appl. No.: 12/148,108

(22) Filed: Apr. 16, 2008

Related U.S. Patent Documents

Reissue of:
(64) Patent No.: 7,029,716
Issued: Apr. 18, 2006
Appl. No.: 10/745,365
Filed: Dec. 23, 2003

U.S. Applications:
(

(63) Continuation-in-part of application No. 10/300,197, filed on Nov. 19, 2002, now Pat. No. 7,074,444, which is a continuation-in-part of application No. 09/640,297, filed on Aug. 16, 2000, now Pat. No. 6,482,457.

(51) Int. Cl.
*A23L 1/20* (2006.01)
*A23L 1/212* (2006.01)
*A23P 1/00* (2006.01)
*A21D 8/00* (2006.01)

(52) U.S. Cl. ..... 426/459; 426/242; 426/634; 426/516; 426/518; 426/502; 426/503; 426/506; 426/464; 426/507; 426/508

(58) Field of Classification Search ..... 426/242, 426/459, 634, 516, 518, 502, 503, 506, 464, 426/507, 508
See application file for complete search history.

(56) References Cited

U.S. PATENT DOCUMENTS 113,063 A 3/1871 Kirkwood
202,975 A 4/1878 Andres
1,011,730 A 12/1911 Braunbeck
1,088,741 A 3/1914 Stephens
1,509,076 A 9/1924 Berczeller
1,609,705 A 12/1926 Forrest
1,813,268 A 7/1931 Bachler
1,859,279 A 5/1932 Chamberlain
2,026,676 A 1/1936 Gill
2,279,280 A 4/1942 Musher
2,343,149 A 2/1944 Krause, Jr.
2,475,554 A 7/1949 Muller
2,489,267 A 11/1949 Chapin et al.
2,541,859 A 2/1951 Callaghan et al.
2,657,999 A 11/1953 Rauch
3,067,042 A 12/1962 Pader
3,253,930 A 5/1966 Gould et al.
3,275,458 A 9/1966 Willard, Jr.
3,290,159 A * 12/1966 Dorsey et al. ..... 426/460
3,291,615 A 12/1966 Thompson et al.
3,317,324 A 5/1967 Austin et al.
3,388,998 A 6/1968 Ozai-Durrani
3,489,571 A 1/1970 Hannum
3,594,185 A 7/1971 Hawley et al.
3,594,186 A 7/1971 Hawley et al.
3,598,610 A 8/1971 Hawley et al.
3,787,595 A 1/1974 Folzenlogen et al.
4,015,341 A 4/1977 McKinney et al.
4,022,919 A 5/1977 Comer
4,073,952 A 2/1978 Standing et al.
4,124,727 A * 11/1978 Rockland et al. ..... 426/549
4,153,738 A 5/1979 Ronai et al.
4,184,420 A 1/1980 Podaras et al.
4,233,322 A 11/1980 Fritze
4,251,558 A * 2/1981 Kobayashi et al. ..... 426/473
4,273,796 A 6/1981 Maxcy et al.
4,295,419 A 10/1981 Langhammer
4,340,611 A 7/1982 McKinney et al.
4,359,480 A 11/1982 Kock
4,372,984 A 2/1983 Bauer
4,400,402 A 8/1983 Vibbert et al.
4,407,840 A 10/1983 Lathrop et al.
4,470,343 A 9/1984 Didier
4,491,065 A 1/1985 Poulson
4,614,660 A 9/1986 Weibye
4,614,665 A 9/1986 Furuya et al.
4,632,833 A 12/1986 Gannon
4,664,924 A 5/1987 Sugisawa et al.
4,676,990 A 6/1987 Huffman et al.
4,728,522 A 3/1988 Wear et al.

| | | | | | |
|---|---|---|---|---|---|
| 4,735,816 | A | | 4/1988 | Sterner et al. | |
| 4,746,968 | A | | 5/1988 | Wear et al. | |
| 4,748,038 | A | | 5/1988 | Lewis et al. | |
| 4,770,893 | A | | 9/1988 | Kluge et al. | |
| 4,785,726 | A | | 11/1988 | Wear et al. | |
| 4,788,072 | A | | 11/1988 | Kawamura | |
| 4,795,651 | A | | 1/1989 | Henderson et al. | |
| 4,810,513 | A | | 3/1989 | Van Liere | |
| 4,810,517 | A | | 3/1989 | Glittenberg et al. | |
| 4,818,558 | A | | 4/1989 | Hartman et al. | |
| 4,828,902 | A | | 5/1989 | Welygan et al. | |
| 4,853,248 | A | * | 8/1989 | Wursch et al. | 426/634 |
| 4,857,357 | A | | 8/1989 | Ammann | |
| 4,871,567 | A | | 10/1989 | Sterner et al. | |
| 4,889,734 | A | | 12/1989 | Shatila | |
| 4,900,578 | A | | 2/1990 | Bakker et al. | |
| 4,923,710 | A | | 5/1990 | van der Marel | |
| 4,943,441 | A | * | 7/1990 | McCabe | 426/511 |
| 5,020,237 | A | | 6/1991 | Gross et al. | |
| 5,089,281 | A | | 2/1992 | Baz et al. | |
| 5,097,754 | A | | 3/1992 | Covington et al. | |
| 5,124,170 | A | | 6/1992 | Sterner et al. | |
| 5,130,153 | A | | 7/1992 | McIlroy et al. | |
| 5,132,127 | A | | 7/1992 | Wisdom | |
| 5,132,133 | A | | 7/1992 | Huber et al. | |
| 5,158,066 | A | | 10/1992 | Dodgen | |
| 5,213,831 | A | | 5/1993 | Leggott et al. | |
| 5,296,253 | A | | 3/1994 | Lusas et al. | |
| 5,322,007 | A | | 6/1994 | Caridis et al. | |
| 5,431,093 | A | | 7/1995 | Dodgen | |
| 5,556,657 | A | | 9/1996 | Akazaki et al. | |
| 5,598,769 | A | | 2/1997 | Luebke et al. | |
| 5,662,029 | A | | 9/1997 | Ubert et al. | |
| 5,704,278 | A | | 1/1998 | Cross | |
| 5,707,671 | A | | 1/1998 | Beck et al. | |
| 5,725,902 | A | | 3/1998 | Lesueur-Brymer et al. | |
| 5,744,188 | A | | 4/1998 | Kolla et al. | |
| 5,786,021 | A | | 7/1998 | Satoh et al. | |
| 5,863,592 | A | | 1/1999 | Sterner et al. | |
| 5,871,801 | A | | 2/1999 | Kazemzadeh | |
| 5,902,629 | A | | 5/1999 | Baker et al. | |
| 5,972,397 | A | | 10/1999 | Durance et al. | |
| 5,972,413 | A | | 10/1999 | Whitney et al. | |
| 5,980,971 | A | | 11/1999 | Walsh | |
| 6,004,590 | A | | 12/1999 | Subramaniam et al. | |
| 6,013,296 | A | | 1/2000 | Kester et al. | |
| 6,027,757 | A | | 2/2000 | Menon | |
| 6,086,933 | A | | 7/2000 | Rockstrom | |
| 6,090,433 | A | | 7/2000 | Sterner et al. | |
| 6,149,957 | A | * | 11/2000 | Mandralis et al. | 426/387 |
| 6,183,798 | B1 | | 2/2001 | Ishii | |
| 6,197,358 | B1 | | 3/2001 | Bunker | |
| 6,220,150 | B1 | | 4/2001 | Margolis | |
| 6,238,725 | B1 | | 5/2001 | Bush et al. | |
| 6,274,189 | B1 | | 8/2001 | Kazemzadeh | |
| 6,287,626 | B1 | | 9/2001 | Fox | |
| 6,312,747 | B1 | | 11/2001 | Villagran et al. | |
| 6,340,494 | B1 | | 1/2002 | Klukowski et al. | |
| 6,355,291 | B1 | | 3/2002 | Rose et al. | |
| 6,465,031 | B1 | | 10/2002 | Bush et al. | |
| 6,482,457 | B1 | | 11/2002 | Margolis | |
| 6,589,589 | B2 | | 7/2003 | Whalen | |
| 6,599,547 | B1 | | 7/2003 | Martinez-Serna Villagran et al. | |
| 6,602,534 | B1 | | 8/2003 | Rose et al. | |
| 6,602,539 | B2 | | 8/2003 | Stubbs et al. | |
| 6,706,298 | B1 | | 3/2004 | Villagran et al. | |
| 7,029,716 | B2 | * | 4/2006 | Margolis | 426/459 |
| 7,074,444 | B2 | * | 7/2006 | Margolis | 426/242 |
| 2002/0127283 | A1 | | 9/2002 | Stemer et al. | |
| 2004/0081730 | A1 | | 4/2004 | Drozd et al. | |

FOREIGN PATENT DOCUMENTS

| | | | | |
|---|---|---|---|---|
| GB | 562648 | | | 7/1944 |
| GB | 648373 | | | 1/1951 |
| GB | 783974 | | | 10/1957 |
| GB | 938381 | | | 10/1963 |
| GB | 1017519 | | | 1/1966 |
| GB | 2118421 | | | 11/1983 |
| GB | 2163938 | | | 3/1986 |
| JP | 2-20259 | | * | 1/1990 |
| RU | 2 038 797 | C1 | | 7/1995 |
| RU | 2038797 | | * | 7/1995 |

OTHER PUBLICATIONS

M.R. Molina, et al.: "Heat Treatment: A Process to Control the Development of the Hard–to–Cook Phenomenon in Black Beans" (Phaseolus vulgaris) (1976; pp. 661–666).

H.J. Morris, et al.: "Processing Quality of Varieties and Strains of Dry Beans" (dated: Jun. 1950; pp. 247–251).

Derwent: Abstract of Acc No. 1996–127368 for RU 2038797 (dated: Jul. 9, 1995).

Ku, S., et al., "Extraction of Oligosaccharides During Cooking of Whole Soybeans", J. Food Science, 41, 361–364 (1976), Kon, S. "Effect of Soaking Temperature on Cooking and Natritional Quality of Beans", J. Food Science, 44, 1329–1340 (1979).

* cited by examiner

*Primary Examiner*—Anthony Weier
(74) *Attorney, Agent, or Firm*—Pillsbury Winthrop Shaw Pittman LLP

(57) ABSTRACT

A method for producing a reconstitutable dehydrated food product, an apparatus for producing such a product, and a product produced thereby are described. The method calls for using a stationary vessel to separately hydrate at least two batches of raw beans with circulating water, as well as a second stationary vessel to separately pressure cook the hydrated beans using direct steam injection with minimal agitation. A first batch is then chopped and sized, and then formed into a generally flat, preferably ribbed sheet of texturized composition. The latter is then dried and broken into chunks. The second batch of beans is kept whole and, once cooked, is dried utilizing a combination convection/microwave heating chamber in such a way as to preserve the integrity of the beans. The dried whole beans are then added to the first batch of beans, and preferably, to the chunks produced therefrom.

114 Claims, 6 Drawing Sheets

METHOD FOR PRODUCING A DEHYDRATED WHOLE FOOD PRODUCT

Matter enclosed in heavy brackets [ ] appears in the original patent but forms no part of this reissue specification; matter printed in italics indicates the additions made by reissue.

RELATED APPLICATION DATA

This is a continuation-in-part of Ser. No. 10/300,197, filed Nov. 19, 2002, *now U.S. Pat. No. 7,074,444,* which is a continuation-in-part of Ser. No. 09/640,297, filed Aug. 16, 2000, now U.S. Pat. No. 6,482,457, and is related to Ser. No. 09/641,754, filed Aug. 16, 2000, now U.S. Pat. No. 6,220, 150.

BACKGROUND OF THE INVENTION

1. Field of the Invention

This invention is in the field of food products and, more particularly, directed to a method and system for producing a dehydrated food product, including whole cooked bean (and other such similar) products in such a way as to preserve the structural integrity of the bean which, in turn, helps provide a food product having significantly enhanced texture and quality.

2. Background

The prevalence of fast-food style establishments in recent years has been accompanied by an increased demand for reconstitutable food products, such as, for example, dehydrated refried beans. From an economic point of view, such products have several advantages. For example, each establishment can buy and store the product in bulk quantities without the risk of spoilage. Also, since the product is normally reconstituted in a matter of minutes by adding only water, there are savings in time, energy, and labor associated with the use of these products. Finally, since there is no need to continually prepare the food product in the conventional manner (i.e., to make the food fresh, and on a daily basis), there is also no need for each establishment to keep extra equipment (e.g., cookware, etc.) on the premises. As such, methods have been devised to produce reconstitutable food products that, ideally, could be prepared very quickly, and would have the taste, texture, and appearance of their conventionally-prepared counterparts.

Current methods and apparati for producing such food products and, more specifically, refried bean products, require that one consider various factors. For example, to satisfy the requirement that the raw beans be mixed as they are hydrated and, also, as they are cooked, a number of the methods presently known employ rotating vessels. Vessels that rotate are used so that the beans can be contacted with a small amount of water that is diminishing as the water is absorbed by the beans. Controlled amounts of water are used during the cooking process in hopes that at the end, little or no water remains—only the cooked, hydrated beans. This is difficult to achieve, and the art has searched for various methods, as excess water can result in yield loss (some of the beans will dissolve into the water) and/or a pasty product that is difficult to further process and dry.

Merely placing the beans in water has other shortcomings. For example, such a method can result in some beans becoming too soft, while others do not become properly hydrated. Further, prior art vessels are generally quite bulky, which not only translates into added and more-frequent maintenance requirements, but also makes it more difficult to achieve economies of scale. Further still, generally, in many prior art vessels only a small amount of beans can be treated. In other words, to achieve the benefit of a small water-to-bean ratio, rotating vessels of particular configurations and having limited capacities were used. Even then, it is difficult to control the water absorption into the beans.

Yet other shortcomings relate to the starting materials that are used. In a typical prior art process for preparing refried beans, dry, raw beans are placed into the vessel, and a small quantity of water is added. Unless the vessel rotates, the beans on the top of the pile could absorb a different amount of water as compared to the beans at a position lower down. Further, as the water level in the vessel decreases, yet further non-uniform water absorption throughout the beans could result. It is known that raw beans typically have an initial moisture content in the range 6%–14%. However, current methods have difficulty using a batch of raw material that spans this entire range because the disparity in initial moisture levels exacerbates the variations in water absorption during hydration with small amounts of water, which would, in turn, result in a non-uniform final product. As such, in order to use many prior art methods and apparatuses, the practitioner is limited to using rotating vessels and to batches of raw materials, each of which falls within a small subgroup of initial moisture-content ranges (e.g., those in the 6–8% range, or those in the 10–12% range, etc.).

An additional phenomenon, which is addressed only partially by current methods and apparati, is the existence of a proportion of "hard" beans in a given batch of raw beans. In this regard, the relevant literature has identified two types of bean "hardness". In the first, a condition of the cotyledon prevents absorption of water by the bean seed. Thus, studies have found that certain beans fail to absorb water even though the seed wall was scarified or removed. These studies further suggest that this condition may be caused by enzymic changes during the storage of seeds in damp atmospheres at high temperatures.

The second, more-frequently encountered type of "hard" bean is one in which the "hardness" is due to hardshell, i.e., an impermeable seed wall. As has been recognized in the art, because untreated hard-shell beans do not soften properly during cooking, when such beans are processed for food, the resulting food product may exhibit poor textural quality. More specifically, in preparing a cooked bean product, the hard-shell bean portion of the initial raw materials will generally remain hard through the soaking and cooking processes. As such, when the hard-shell beans are left untreated, the final (cooked) product will have an inconsistent quality. On the other hand, over-soaking and/or over-cooking of the entire bean batch in order to render the untreated hard-shell beans palatable may cause the remaining (non-hard shell) beans to disintegrate, resulting in a final product that has a mushy consistency.

Irrespective of the source of the "hardness" in beans, it is well known that lower moisture beans (i.e., those with a moisture content of less than about 10%) have a greater tendency to be classified as "hard". Since beans are only harvested once a year, the beans that have been stored for more than about 6 months tend to dry out and suffer more from the "hard bean" phenomenon, causing major product quality variation.

In light of the above, the prior art has suggested various means of addressing the "hard bean" phenomenon. One such means involves heat treatment, whereby the beans are steamed, or treating with hot water, prior to storage and/or soaking. However, such treatment does not guarantee elimination of hard-shell beans.

Alternatively, U.S. Pat. No. 4,871,567 (the "567 patent") suggests "tempering", whereby, once the beans have been washed and drained, they are permitted to simply sit for a period of "equilibrium" which lasts four or more hours. This procedure, however, introduces a relatively long period of downtime, thus making the overall process of producing a dehydrated reconstitutable food product very time consuming. In addition, as is recognized in the '567 patent, sitting food products often lend themselves to deleterious effects, such as souring or other undesirable flavor changes. Such deleterious effects may only be dealt with by introducing additional processing steps, which makes the overall process even more complex and time consuming and, as a result, reduces overall processing efficiency.

In the current state of the art, there are also disadvantages associated with the end product itself (e.g., with the dehydrated bean product). For example, even though one goal of dehydrated food products is to allow for rapid water take-up at reconstitution, this goal is only partially met in current dehydrated bean products. As is known in the art, most current methods produce products that are either in the shape of small pellets or in the shape of flakes or in the shape of fine powder. In the case of pellets, because of the way in which the final product is prepared, typically only a small portion of the surface area of each pellet (i.e., typically, the two ends of each pellet) provides areas through which water can easily be absorbed; the remainder of the pellet's outer surface is inefficient in absorbing water. Flakes, on the other hand, due to their method of manufacture, have a harder outer surface and are generally treated with oil on their surface, which is a water repellent, so that water take-up upon reconstitution is actually slower than it may be otherwise. Therefore, in both cases, water absorption rates are not optimal.

Moreover, upon reconstitution, many of the dehydrated products currently available turn into paste-like, or other similar, uniform compositions, where there is generally a lack of texture in the food. This is especially true with methods and apparatuses that produce a granular, rather than a pelletized, or flake-like, dehydrated product. In addition, regardless of the actual shape and form of the final product, there is no simple provision in existing methods and apparatuses for varying (i.e., custom making) the texture of the final product as desired.

Reference is made to U.S. Pat. Nos. 4,676,990, 4,735,816, and 4,871,567 as further examples of the prior art. These references illustrate various bean-making processes, but all have a number of shortcomings. For example, in the '990 patent, a pelletized product is produced by particularized processing steps and related apparatus. In the '816 and '567 patents, a thin, flake-like product is produced by means of yet other particularized processing steps and apparatus. These processes are complicated and the final products are only marginally close to refried beans made to have a pleasant texture with a desired amount of bean particulates.

To address some of the issues relating to the lack of adequate texture in the reconstituted food, attempts have been made in the prior art to add dehydrated whole beans to the aforementioned products. However, such attempts have been met with difficulties as dehydration of cooked whole beans has generally been accompanied by a considerable amount of "bird mouthing".

Bird mouthing, also referred to as "butterflying", is a phenomenon wherein the whole bean splits along its two halves and opens during the dehydration process. It is believed that bird mouthing is caused by a differential rate of drying between the bean skin and cotyledon, such that, during the dehydration process, the bean skin dries more rapidly than the cotyledon, and thus, contracts (a condition which is referred to as "case hardening"). As dehydration continues, the slower-drying cotyledon develops internal vapor pressure to an extent where the pressure ruptures the skin and causes bird mouthing.

Reference is made to U.S. Pat. Nos. 3,290,159 and 4,871,567 as examples of the prior art's attempts to reduce the amount of bird mouthing in dehydration of whole beans. For example, the '159 patent discloses a two-stage dehydration process, wherein the first stage involves a slower moisture-removal process, and the second stage involves a more rapid dehydration process. Both stages of the disclosed methodology are directed to drying using conventional air dryers. Similarly, the '567 patent discloses a dehydration process comprising two or more "stages". However, in contrast to the '159 patent, the '567 patent teaches a method involving incremental decreases, rather than increases, in the amount of heat supplied during the dehydration process. Nevertheless, neither methodology seems to have resolved, to an appreciable degree, the problem of bird mouthing.

An additional drawback associated with the process disclosed in the '159 patent is that, in order to be effective, the process calls for slow drying rates. Such slow drying rates translate into relatively long drying times (e.g., on the order of 4–6 hours) which, in turn, result in low levels of throughput per unit time. Similarly, the process disclosed in the '567 patent calls for an initial period of high-humidity drying which, again, results in longer drying times. This is especially true when convective heating is utilized to dry the beans since convective dehydration efficiency drops off drastically during the latter stages of drying particulate material when moisture diffusion from the center of the particle controls the drying rate.

Food manufacturers have also used equipment and/or forms of energy other than conventional air dryers to produce dehydrated food products. In this regard, reference is made to U.S. Pat. Nos. 4,073,952 and 6,197,358. The '952 patent discloses a method of making dehydrated potatoes, wherein the method includes drying pieces of potato by exposing them simultaneously to microwave energy and to hot air. The hot air is enriched with moisture to maintain an average humidity of at least 83% in the oven during most of the drying period. In addition, about 10–50% of the energy used for drying is provided by moisture-enriched air that is heated to between 75 and 255° F. and, typically, to 100–150° F.

However, being unrelated to the production of dehydrated bean products, the '952 patent does not address bird mouthing at all. Rather, it teaches a combination microwave/hot air drying process in order to minimize discoloration and loss of flavor for potato pieces. Similarly, the '358 patent is related to a process in which microwave energy may be used during the production of dehydrated potato products, but not during the drying step.

The features and advantages of the present invention will become more apparent through the following description. It should be understood, however, that the detailed description and specific examples, while indicating particular embodiments of the invention, are given by way of illustration only and various modifications may naturally be performed without deviating from the spirit of the present invention.

DETAILED DESCRIPTION

Figure 1:
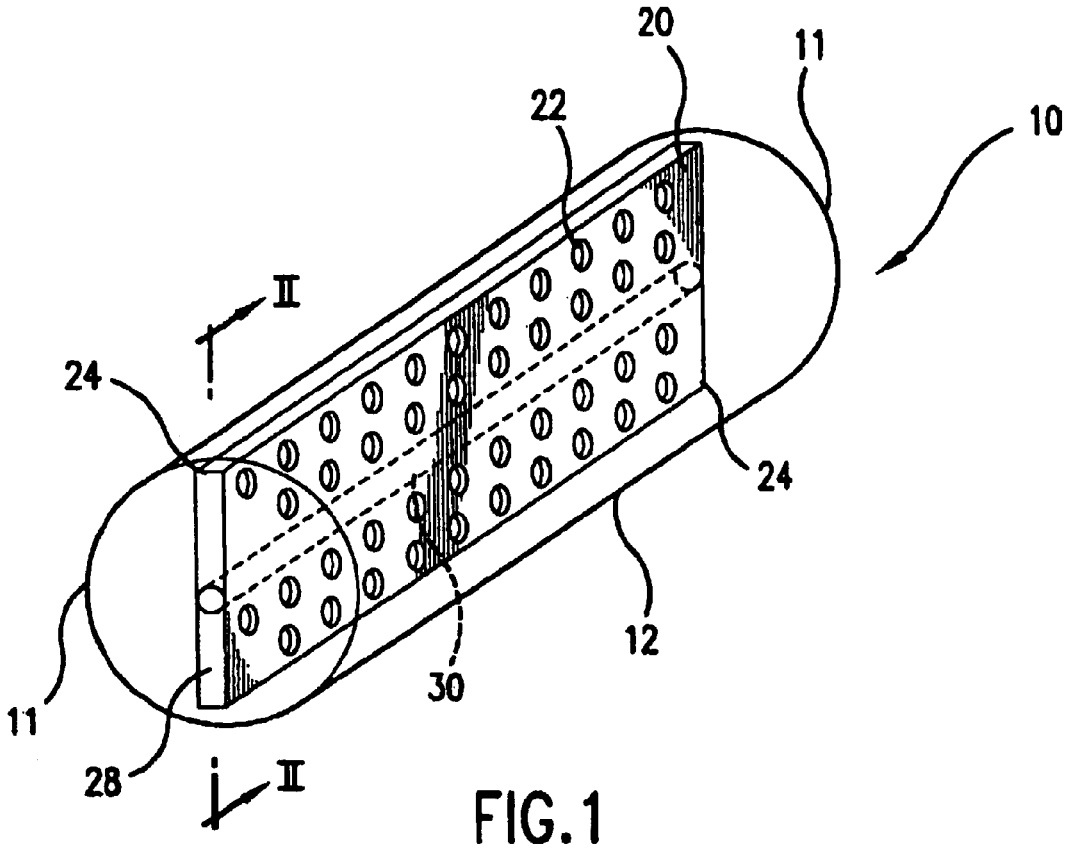
FIG. 1 shows an illustration of a hydration/cooking vessel and rotatable member of an apparatus that may be used in the practice of an embodiment of the invention.

An embodiment of the present invention is related to a method or process for producing a reconstitutable, dehydrated food product, which may be practiced by the use of apparatus comprising a stationary hydration vessel, a stationary cooking vessel, a chopping system, a forming mechanism, and a drying system.

It is well known that food products, such as beans, soften and become fragile as they are hydrated and cooked, making their subsequent processing difficult and the dehydrated product variable in quality. As such, embodiments of the present invention are directed towards stationary processes that minimize (or completely eliminate) movement of the beans.

In order to cook raw beans (with an initial moisture content in the range 6%–14%, e.g.), they have to be uniformly hydrated either prior to, or simultaneously with, cooking. Unfortunately, uniform hydration is difficult due to the variable presence of "hard" beans that are difficult to hydrate.

Surprisingly, it has been discovered that these "hard" beans tend to float in water at temperatures of about 200° F. Thus, contacting beans with hot water, as is frequently done to accelerate their hydration, actually makes the hydration more difficult and variable since the "harder" beans float to the water/air interface. However, if the raw beans are maintained below the water/air interface by, for example, a restraining screen, then much more uniform and rapid hydration occurs. Of course, it is well known to hydrate beans at low temperatures, in which case the issue of floating "hard" beans is eliminated. However, such low-temperature hydration methods require that the beans be sedentary in water for prolonged periods of time (e.g., 10–12 hours), which renders such traditional hydration methods commercially unfeasible.

In order to hydrate variable-quality (i.e., with respect to "hardness") beans in as gentle a way as possible, a stationary hydration vessel is used that may be generally vertically elongated and includes means for maintaining the beans below a water/air interface, as well as means (e.g., standard pump, tubing, and inlet valve) for introducing and circulating a wetting liquid through the vessel and the beans.

At the beginning of the hydration step, raw cleaned beans are placed within the vessel; the beans are maintained below the water/air interface (i.e., below the water, or wetting liquid, level) throughout a predetermined hydration period. Upon termination of the hydration period, beans that have been adequately hydrated generally sink to the bottom of the vessel and are removed. "Harder" beans, however, that tend to buoy up towards the upper portion of the hydration vessel are captured (e.g., by means of a mesh screen) during hydration, and if still "hard", removed at the end of the hydration period and optionally returned to the vessel for additional hydration with a subsequent batch of raw beans. In addition, after each hydration period, a "broth", comprising the unabsorbed portion of the wetting liquid and a proportion of bean solids is removed from the vessel. Optionally, the broth may be further processed to separate the bean solids therefrom, and some or all of these bean solids may be returned to the beans at a later stage in the process.

The stationary cooking vessel is equipped with a perforated, rotatable internal baffle which may be rotated periodically to ensure contacting, if necessary, of all beans or other foods with a small and continuous diminishing quantity of water; the baffle holes ensure that fluids within the vessel are exchanged freely between the two chambers of the vessel as defined by the baffle. Once cooked, the beans are transferred to the chopping system, wherein they are urged through a channel, comprising a rotating blade that chops, and a perforated plate that re-sizes, the beans into a texturized composition. The blade speed and the size of the holes in the perforated plate can be changed in order to achieve different textures within the composition. The latter is then treated in a forming mechanism, comprising a shaped conduit, wherein the composition is formed into a generally flat sheet, which is then treated so as to produce an improved reconstitutable dehydrated bean product. In certain embodiments, the generally flat sheet may be ribbed, or ridged, on either, or both, of its top and bottom surfaces.

The stationary cooking vessel of the present invention has significant processing advantages. First, since the vessel is stationary, it is relatively simple to construct large units which result in substantial economies of scale. Second, by using a horizontal cooking vessel with a perforated internal baffle having a length and width that are substantially the same as the vessel, it is easy to assure that, when needed during processing, all of the beans are gently and continuously contacted with a small, and diminishing quantity of liquid.

Indeed, under certain embodiments of the present invention, the perforated internal baffle can be completely eliminated provided that the beans have been adequately hydrated prior to cooking. In this manner, movement of the beans during cooking is essentially eliminated.

Embodiments of the present invention are directed to a method of preparing a reconstitutable, dehydrated food product by means of hydrating and cooking raw beans, so that all of the cooked beans achieve a similar moisture content, chopping the cooked beans and forming the chopped beans into a flat sheet of texturized composition, drying the sheet, and breaking the sheet into smaller pieces.

The above-described process results in a dehydrated bean product that absorbs water faster and more uniformly upon reconstitution. Also, after the raw beans have been hydrated, the broth can be partially, if desired, removed from the hydration vessel, thus eliminating some flatulent sugars from, and improving the digestibility of, the final bean product. Moreover, salt, oil, colorant, and other flavoring may be added during the chopping, or other steps, of the above-described process.

Finally, depending on the desired texture and chunkiness of the final product, a portion of hydrated and cooked whole beans may be removed before the chopping step, and then added to the beans in a subsequent step, or after drying to the final product upon reconstitution. Alternatively, whole beans may be independently hydrated, cooked, flavored, and dried, and then mixed with dehydrated small pieces of chopped beans produced separately. In yet another alternative embodiment, a portion of hydrated whole beans may be separately cooked, flavored, and dried, and then mixed with dehydrated small pieces of chopped beans produced separately from the remainder of the hydrated beans. In yet another alternative embodiment, the hydrated whole beans may be cooked, flavored and dried. Such product can then be used where quickly reconstitutable whole beans are desired as needed.

Figure 4:
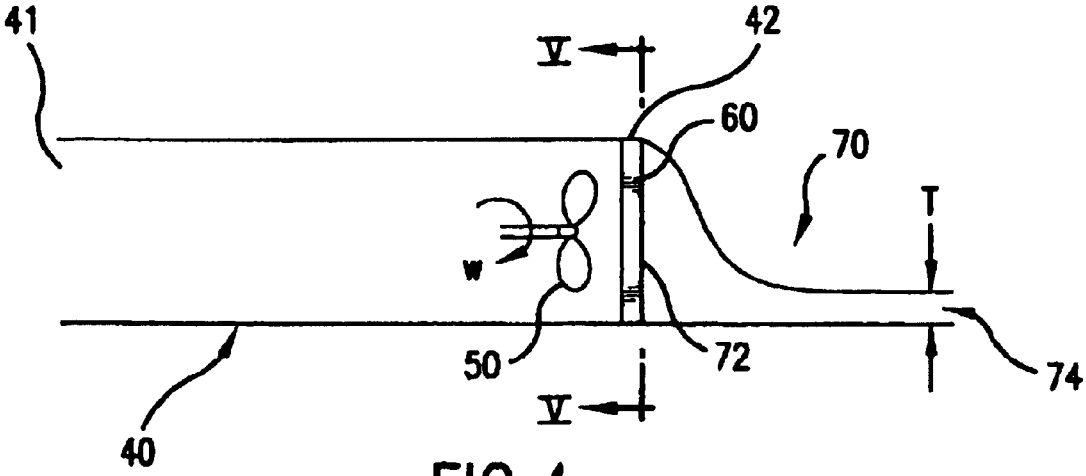
FIG. 4 shows an illustration of a channel and forming conduit of an apparatus that may be used in the practice of an embodiment of the invention.

FIGS. 1 and 4 show one embodiment of the apparati which may be used to practice the invention. As shown in these figures, a stationary vessel 10 comprises a vessel shell 12, and a central shaft 30. Although the figures show that the vessel 10 has a substantially circular cross-section, this is done for purposes of demonstration only, and it is intended that the invention encompass other vessel configurations as well.

The vessel 10 is also equipped with a solid-blade baffle 20, which is attached to, and is rotatable around, shaft 30. In one embodiment, baffle 20 has a length and width that are substantially as long as the length and width, respectively, of the vessel 10. Therefore, in the embodiment of FIGS. 1 and 2, the width of the baffle 20 is substantially commensurate with the diameter of a cross-section of the vessel 10. To ensure proper operation, a clearance of less than 3/16 inch is maintained between the inner surface 18 of the shell 12 and an edge 24 of the baffle 20, as well as between an end 28 of the baffle 20 and an end 11 of the vessel 10.

Figure 2:
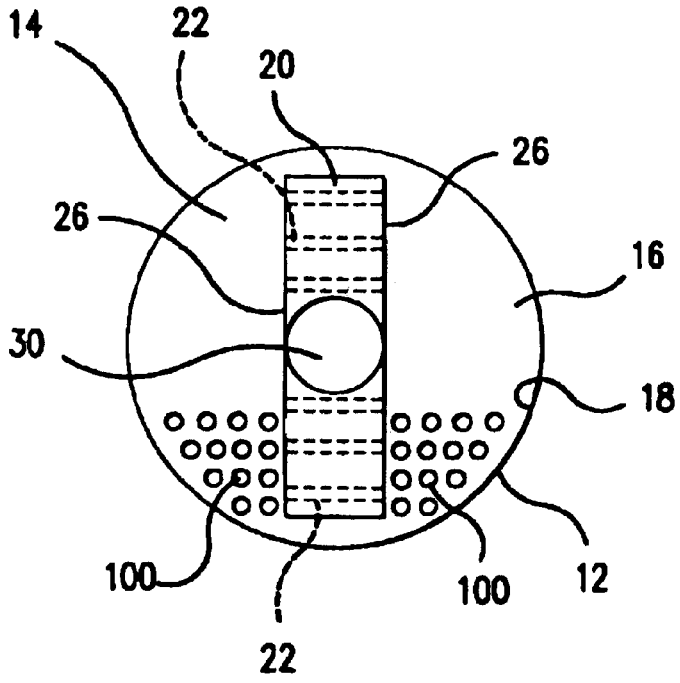
FIG. 2 shows a cross-sectional view of the vessel and rotating member of FIG. 1, taken along line II—II.

As is shown in FIG. 2, at any point in time, the baffle 20 divides the inner space of the vessel 10 into two chambers, 14 and 16, where each chamber is defined substantially by the space between the inner surface 18 of the vessel shell 12, and a wall 26 of the baffle 20. The solid-blade baffle 20 has transverse holes 22 (shown in FIG. 1, and by dashed lines in FIG. 2) which, while large enough to allow fluids within the vessel 10 to travel between the chambers 14 and 16, are small enough to keep the vessel contents 100 separated on each side of the baffle 20.

Figure 3:
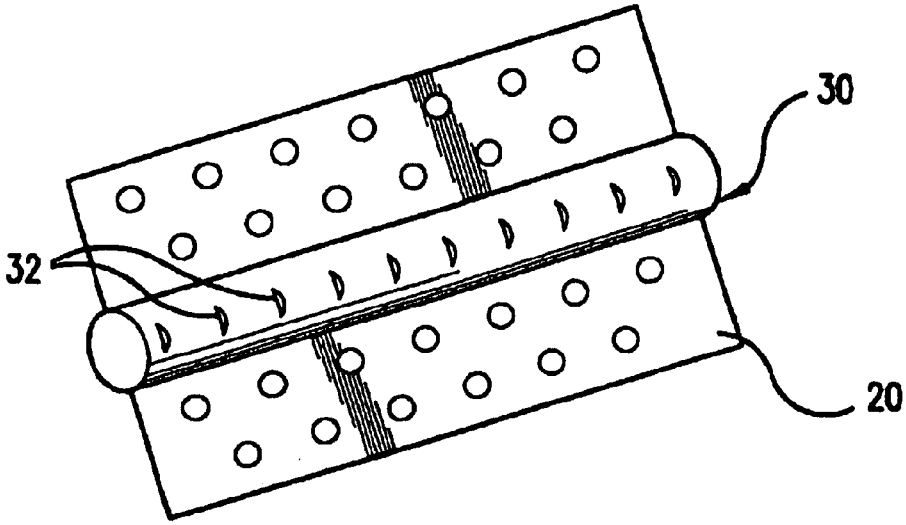
FIG. 3 shows an illustration of a shaft and rotatable member of an embodiment of the cooking vessel shown in FIG. 1.

In one embodiment, the vessel 10 may be employed both to hydrate raw beans and to cook the hydrated beans. As will be explained in detail below, when used in the latter capacity, the vessel 10 is transformed into a pressure cooker, using steam to cook the beans. To achieve uniform steam injection into the chambers 14 and 16, steam is forced through the shaft 30, and enters each chamber 14, 16 through steam outlets 32 which are arranged along the length of the shaft 30 (FIG. 3). However, steam can also be injected into the vessel through other suitably placed entrances to the vessel.

Figure 9:
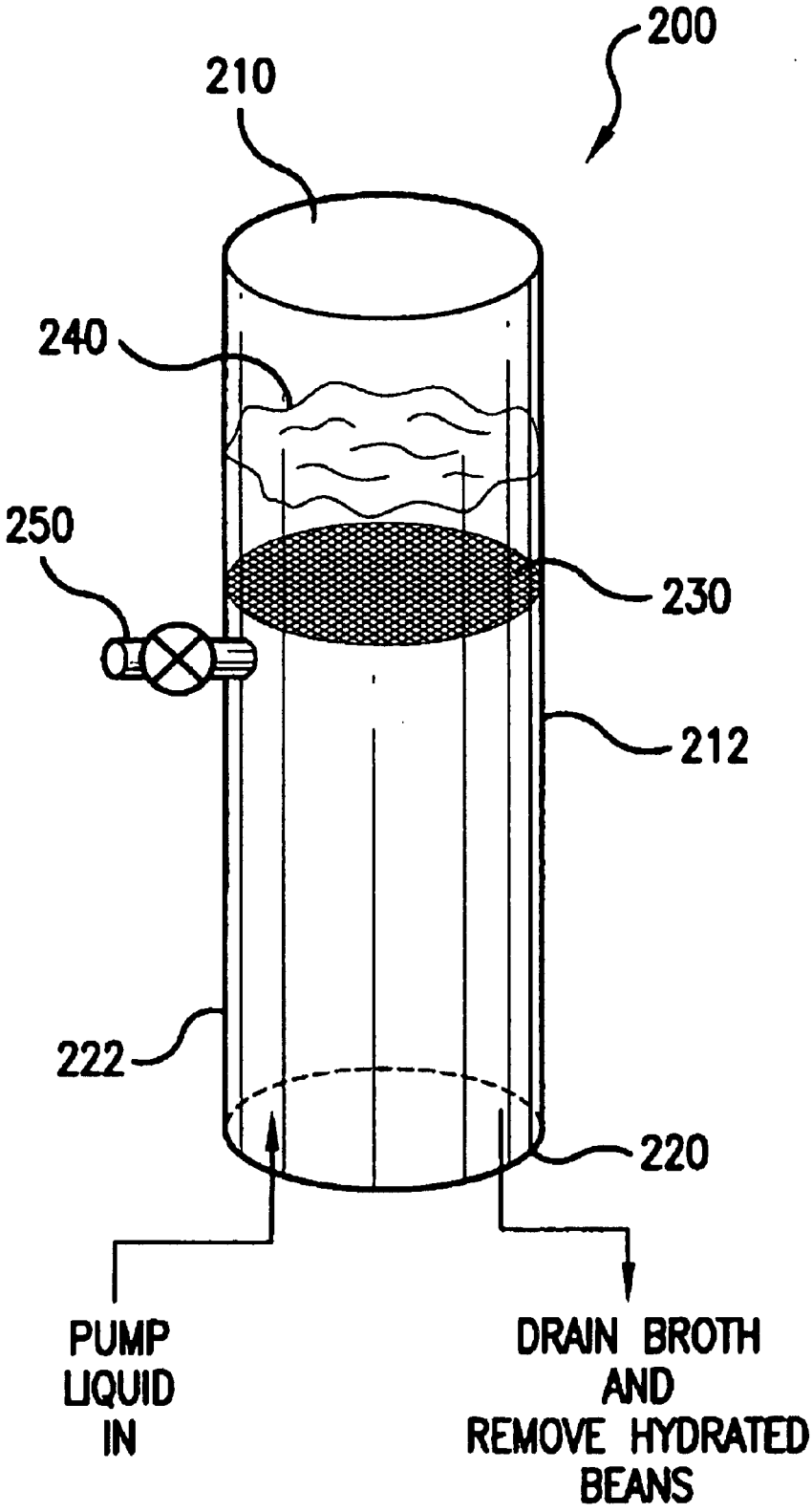
FIG. 9 shows an illustration of a hydration vessel that may be used in the practice of an embodiment of the invention.

In a preferred embodiment, a separate, stationary hydration vessel 200 is used to hydrate the beans, which are then transferred to vessel 10 in order to be cooked (see FIG. 9). Hydration vessel 200 is generally vertically elongated, with a top end 210 and a bottom end 220, and includes means (such as an inlet valve or similar structure, e.g., at its bottom end 220) for introducing a wetting liquid into the vessel to establish a liquid level 240 such that all of the beans are immersed into the liquid. Thus, the wetting liquid may be pumped into the hydration vessel 200 such that the liquid is circulated through the beans within the vessel 200 for a predetermined hydration period which, typically, may last between 40 and 150 minutes.

Below the liquid level 240, the hydration vessel 200 is equipped with means for capturing harder beans that may not hydrate adequately during the allotted hydration period and, as such, buoy up towards the upper end 212 of the vessel 200 (i.e., "floater" beans). The capturing means may include, for example, a mesh screen 230, or similar structure. Below the capturing means 230, the hydration vessel 200 includes means, such as a release valve 250, for removing the floater beans from the vessel 200 upon termination of the hydration period.

On the other hand, upon termination of the hydration period, beans that have been adequately hydrated and, as such, have generally sunk towards a lower portion 222 of the vessel 200 may be removed through outlet means (e.g., an outlet valve or similar structure) which may be placed at the bottom 220 of the vessel 200. In addition, after each hydration period, a "broth", comprising the unabsorbed portion of the wetting liquid and a proportion of bean solids may also be removed from the vessel 200 through the same, or an additional, outlet means (not shown), which may also be placed at the bottom 220 of the vessel 200.

Experimental results surprisingly indicate that "hard" beans tend to float in water with temperatures in excess of about 200° F. As such, using the above-described hydration vessel and carrying out the above-described hydration process, especially at temperatures within the range 180–210° F., is advantageous as it ensures that: (1) all of the beans are immersed in water throughout the hydration period; (2) "hard" beans can be identified and recycled until suitable for cooking, thus allowing efficient use of all of the beans and substantially eliminating hard beans from the final bean product upon reconstitution; and (3) hydration of the beans can be accomplished in a quick and gentle fashion, thus minimizing any damage to the beans.

In one embodiment, the hydration vessel 200 may have a circular cylindrical configuration, with a height of about 10 feet, and a circular base having an inner diameter of about 3 feet. However, other configurations and dimensions may also be used in practicing the invention.

In addition, bean solids that are dissolved in the broth that remains at the end of the hydration period can be recovered (e.g., by evaporation, filtration, spray drying, etc.) and added back to the cooked beans either in concentrated or dried form. Alternatively, the broth itself (or the unabsorbed portion of the wetting liquid therein) may be added to water and introduced into the hydration vessel for hydration of a subsequent batch of beans, or flavors can be recovered (e.g., by steam stripping) from the broth for back addition to the cooked and chopped beans (see below).

It is also mentioned that, although, in principle, the beans could be hydrated by just allowing them to soak in the water for a period of time, experience has shown that this practice results in non-uniform water absorption by the beans. That is, over time, as the beans on the top of the pile absorb water, the water level in the vessel decreases, which causes non-uniform water absorption throughout the pile of beans.

On the other hand, it is known that raw beans typically have an initial moisture content in the range 6%–14%. However, given their non-uniform hydration procedures, prior-art methods cannot use a batch of raw materials that includes beans and legumes from this entire range because the disparity in initial moisture levels may exacerbate the variations in water absorption during hydration, so that the result would be a highly non-uniform final product. As such, for every batch of raw materials, the prior art is limited to using raw beans that fall within a small range of initial moisture content, e.g., 6–8%, or 12–14%. The present invention, however, is not so limited.

In a preferred embodiment, the hydrated beans can then be cooked in a stationary cooking vessel 10 by simply placing them on the upper side of the baffle 20 when the latter is in the horizontal position. Since there is no need to have any further water in the vessel 10 while the beans are being cooked, it is not necessary to rotate baffle 20 during the cooking step. The hydrated beans are cooked using direct steam injection. Alternatively, the separately hydrated beans can be pressure cooked in a vessel with no rotatable baffle, provided the beans are sufficiently elevated off the bottom of the cooker to prevent the steam condensate from contacting the lower beans.

An option, at this point, is to add salt or other flavoring, colorant, oil and/or similar additives to the cooking vessel 10. Also, either as a substitute for, or a supplement to, this option, oil, colorant, salt, and/or other flavoring may be added at various other steps within the process (e.g., after cooking or during the chopping step).

In order to cook the beans, steam is directly injected into the vessel 10 and chambers 14 and 16, such that the vessel 10 is pressurized above atmospheric pressure, and the beans are cooked at a temperature in the range 228° F.–270° F. and pressure in the range 5 psig–25 psig for a predetermined cooking period. During the cooking step, the cooking vessel 10 remains stationary, and the baffle 20 may either remain stationary, or rotate around the central shaft 30 for a minimal number of times. However, if the baffle 20 rotates, it is possible to drain any water condensate off the bottom of the cooker prior to rotation, so as to further minimize any contact of cooking beans with water.

It has been found that, when the baffle 20 is held stationary during at least a majority of the cooking period, there are no beans that are always in contact with water from condensed cooking steam that may gather at the bottom of the cooking vessel 10. This, in turn, results in beans that are uniformly cooked. In addition, reducing bean movement, or agitation, such as the kind that may be caused by frequent rotation of the baffle 20, allows whole cooked beans to be produced with minimal crushing.

Figure 5:
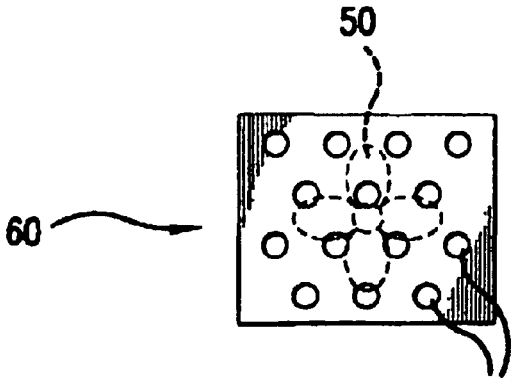
FIG. 5 shows a cross-sectional view of the channel and forming conduit of FIG. 4, taken along line V—V.

At the end of the cooking step, the beans are removed and transferred to a channel 40 having a proximal end 41 and a distal end 42 (see FIGS. 4 and 5). Within channel 40, the cooked beans are urged towards the distal end 42 via a piston or other suitable mechanism, such as a rotating shaft with advancing frights. As the beans are urged forward, they are chopped by a rotating blade 50, which rotates at an angular velocity ω. The beans are then pushed through the holes 62 of a perforated plate 60, which is located distal to the rotating blade 50 and re-sizes the chopped beans as they travel past the plate. In this way, a texturized composition is created, wherein the texture, or chunkiness, of the composition (and of the final bean product) is determined by the angular velocity ω of the blade 50 and the hole sizes of the plate 60. Therefore, the present invention offers the capability of varying the texture of the final bean product to a desired consistency by changing the blade angular velocity ω, the size of the plate holes 62, or both.

The chopped beans are next fed through a forming conduit 70. As shown in FIG. 4, in a preferred embodiment, the inlet 72 of the forming conduit 70 is connected to the distal end 42 of the channel 40. However, this is not required, as long as the conduit 70 and the channel 40 are in flow communication, so that chopped beans exiting the channel from its distal end 42 flow into the forming conduit through its inlet 72. For example, the inlet 72 may comprise a hopper, or other inlet configuration, that is situated within close proximity of, but not necessarily connected to, the channel 40. Regardless, once the chopped beans are in the conduit 70, they are urged towards the conduit outlet 74. The outlet 74 has a generally rectangular cross-section which may have ridges on its top and/or bottom surface(s), a thickness T, and a width that is considerably larger than T. Therefore, as the texturized composition exits the conduit outlet 74, it is formed into a generally flat, continuous elongated sheet of rectangular cross-section that may have ridges 99 on its top and/or bottom surface(s). Additives, such as salt, oil, flavorings, and/or colorants may be added to the beans during the chopping and/or forming steps so as to result in a uniform dispersion of these additives.

Figure 8A:
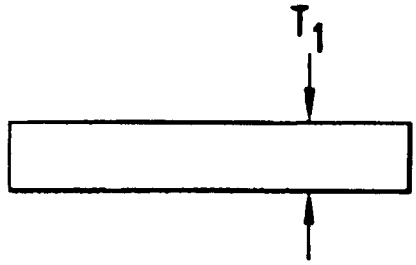
FIGS. 8A–8C show various cross-sections of a sheet of textured material according to an embodiment of the invention.
Figure 8B:
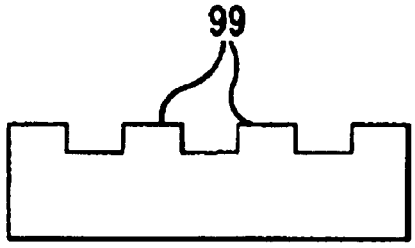
Figure 8C:
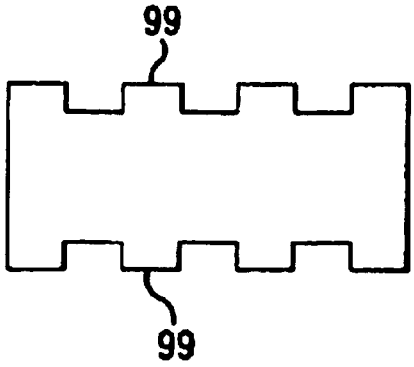

FIGS. 8A–8C show various cross-sections of the sheet of textured material. For example, where the outlet 74 of the forming conduit 70 has a rectangular cross-section of thickness T (see FIG. 4), a generally flat sheet of textured composition is produced that also has a generally rectangular cross-section, with thickness $T_1$ (see FIG. 8A), where the magnitude of $T_1$ may be slightly less than the magnitude of T. On the other hand, the outlet 74 may have ridges, or ribs, on its top and/or bottom surface(s). As shown in FIGS. 8B and 8C, this will result in a sheet of texturized composition that also has ridges (or ribs) 99 running longitudinally on its top and/or bottom surface(s).

It is noted that the cross-sectional configuration of the sheet of texturized composition is generally determined by striking a balance between throughput and drying efficiency. That is, on the one hand, the thicker the sheet of texturized composition, the higher the amount of beans that can be processed for a given speed through the forming conduit 70. On the other hand, the thicker the sheet of texturized composition, the higher the required amount of time for exposure to heat (or other drying mechanism) which, in turn, translates into a slower processing speed—or, put another way, if the speed is kept constant, then a thicker sheet of composition may not be sufficiently dried. In this regard, experimental results indicate that, in a preferred embodiment, all sections of the sheet are typically less than about ¼ inch thick.

The elongated sheet of texturized composition is next dried and then broken up, or formed, into chunks, where each chunk may be approximately 0.25 to 0.50 inch in size. In a preferred embodiment, the drying step is accomplished by drying the elongated sheet of texturized composition in a combination microwave/convection dryer, where the sheet is dried to a final moisture content of less than about 9–10%. This drying arrangement provides for control over the characteristics (e.g., flavor) of the final product, as well as a higher level of efficiency and throughput by the overall process. Thus, for example, during the drying step, the sheet of texturized composition may be toasted (to enhance flavor) by adjusting the convection air temperature. On the other hand, the microwave-energy mode allows drying of ribbed sheets of texturized composition of a thickness greater than ½–⅝ inch in relatively short time periods.

Processing the beans as described above produces chunks of dehydrated bean product that have rough, uneven, and porous edges. Moreover, each chunk has a larger surface area containing these rough edges than do bean products prepared according to prior-art methods. This translates into pieces with porous edges that take up and absorb water much more easily and quickly upon rehydration than is available in the prior art. Generally, pieces having a thickness of ⅛ inch or greater are within the scope of the present invention, although the invention is not so limited and other thicknesses may also be employed in practicing the invention.

Figure 6:
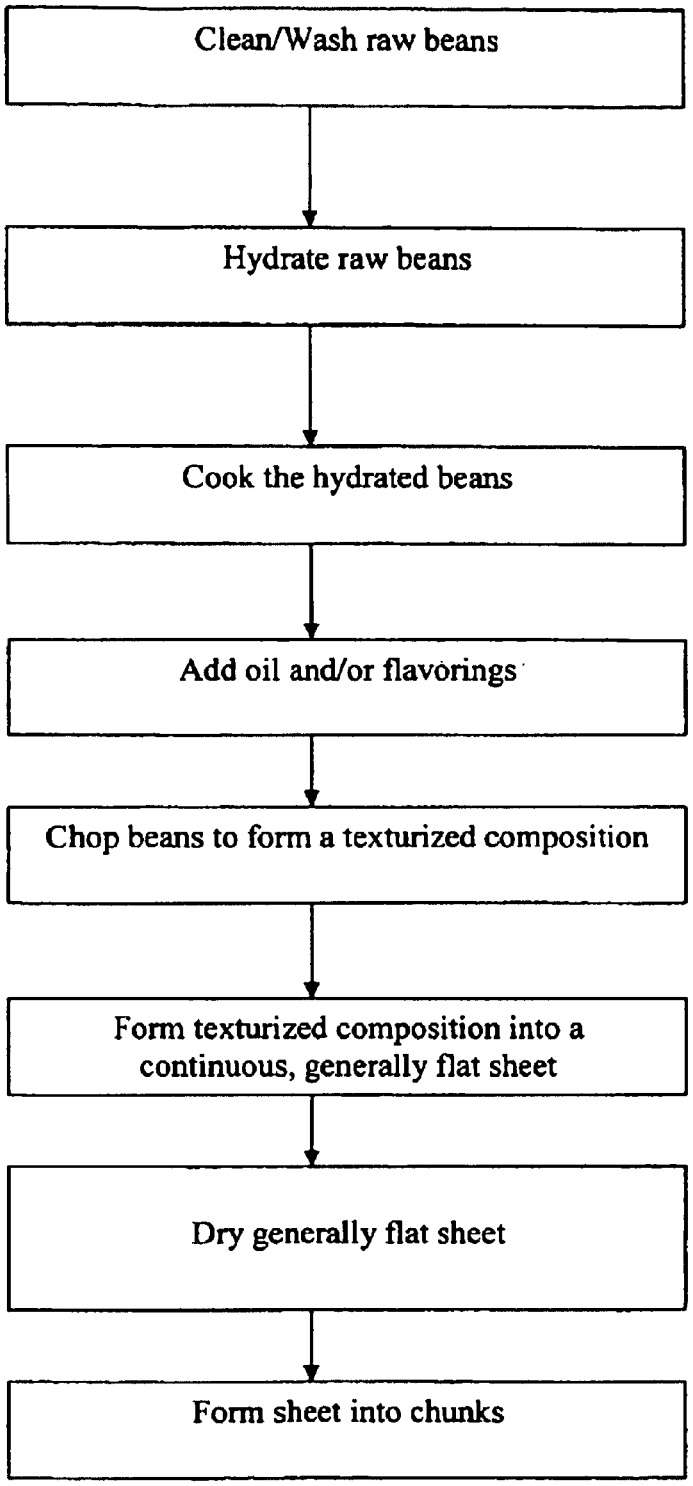
FIG. 6 shows a condensed flow-chart format of an embodiment of the invention.
Figure 7:
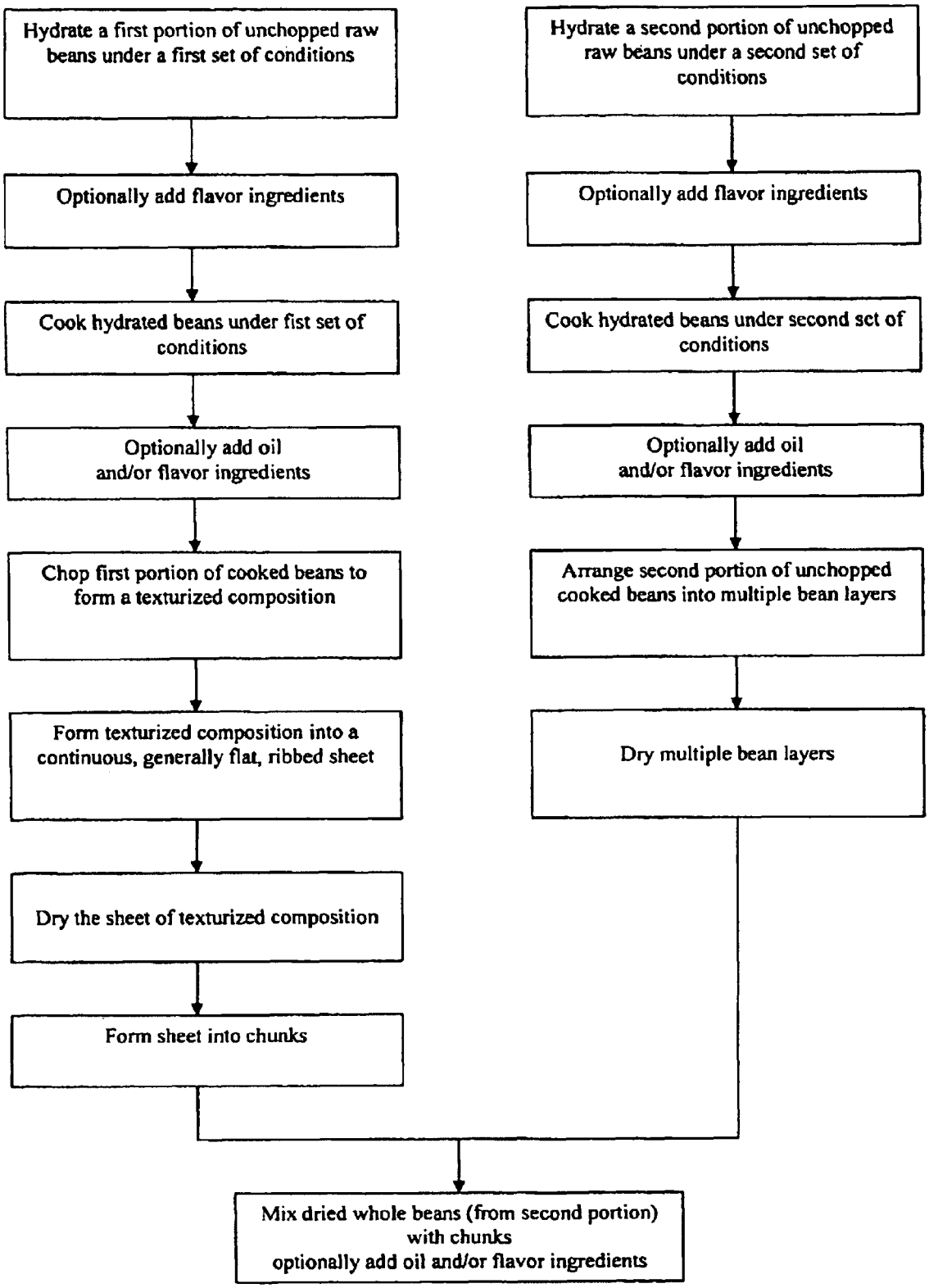
FIG. 7 shows a condensed flow-chart format of an alternative embodiment of the invention.

FIG. 6 shows, in condensed flow-chart format, an embodiment of a method of the invention. As shown in FIG. 7, in a preferred embodiment, separate portions of beans, e.g., those destined to be chopped and those that are maintained whole, are processed separately and under different processing conditions (e.g., using different hydration times, different cooking temperatures, etc. to make the chopped beans more tender than the whole beans). Thus, in one preferred embodiment, while the beans destined to be chopped are processed as described above, the beans destined to remain whole are processed separately, and then mixed with the chunks. In an alternative embodiment, the chunks and whole beans can be kept separate and used as desired in that form.

In this regard, aspects of embodiments of the present invention are directed to a method of preparing a reconstitutable, dehydrated whole bean product in such a way as to preserve the structural integrity of the whole beans which, in turn, would significantly enhance the texture and quality of the final bean product containing the whole beans. As has been set forth above, such a method must address, and significantly decrease, the amount of bird mouthing that is prevalent in methods currently existing in the art, without adversely affecting productivity levels (i.e., throughput).

In one aspect, the above-mentioned goals are achieved by a method of preparing dehydrated whole beans so as to preserve the beans' structural integrity, wherein the method comprises:

cleaning, washing, hydrating, and cooking raw beans; and drying the cooked beans in a combination microwave-convection heating process, wherein the beans are dried by exposure to both microwave energy and convective heating energy.

The above-mentioned goals are also achieved by a method of preparing dehydrated whole beans so as to preserve the structural integrity of substantially all of the beans (i.e., less than about 25% by weight incidence of bird mouthing in the dehydrated product), wherein the method comprises:

providing a heating chamber for drying of cooked beans, wherein said chamber includes means for continuously advancing the cooked beans through said chamber; and drying the cooked beans in said chamber by exposing said beans to both microwave energy and convective heating energy.

In yet another aspect, the above-mentioned goals are achieved by a method of preparing dehydrated whole beans so as to preserve the beans' structural integrity, wherein the method comprises: cleaning, washing, hydrating, and cooking raw beans; arranging the cooked beans into multiple bean layers; and drying said layers of cooked beans using microwave energy, convective heating, or both microwave energy and convective heating energy.

In another aspect, a method of preparing dehydrated whole beans so as to preserve the structural integrity of substantially all of the beans comprises: providing a heating chamber for drying of cooked beans, wherein said chamber includes means for continuously advancing the cooked beans through said chamber; arranging the cooked beans into multiple bean layers; and drying said layers of cooked beans in said chamber using either microwave energy, convective heating, or both microwave energy and convective heating energy.

Thus, embodiments of the present invention utilize microwave energy and/or convective energy to efficiently dry cooked whole beans and minimize "bird mouthing". As indicated by data collected from experiments, in a "dual-mode" drying process, use of the microwave mode will heat water from inside each bean, thus minimizing case hardening, and use of the convective mode will "blow" away evaporated water.

In light of the various means of addressing bird mouthing, and with reference to FIG. 7, embodiments of the present invention are also directed to a method for producing a reconstitutable dehydrated chunky bean product so as to substantially eliminate hard beans from the bean product, the method comprising:

separately hydrating first and second portions of raw beans by maintaining the entirety of said first and second portions submerged in a wetting liquid for respective hydration periods so as to obtain respective first and second portions of unchopped hydrated beans;

separately cooking each of said first and second portions of hydrated beans to obtain respective first and second portions of unchopped cooked beans;

chopping said first portion of the cooked beans to form a composition of a desired texture;

forming the texturized composition into a generally flat sheet;

drying the flat sheet of texturized composition;

forming the sheet into chunks;

drying the second portion of unchopped cooked beans using microwave energy, convective heating, or both microwave energy and convective heating energy; and adding the dried second portion of unchopped cooked beans to said chunks.

In an alternative embodiment, the method for producing a reconstitutable dehydrated chunky bean product so as to substantially eliminate hard beans from the bean product comprises arranging the second portion of unchopped cooked beans into a stack of multiple bean layers, and then drying the layers using microwave energy, convective heating, or both microwave energy and convective heating energy prior to adding the second portion of unchopped cooked beans to the chunks.

It is noted that, in the above description, the designations "first" and "second" are used for identification purposes only and do not necessarily indicate an order of carrying out an embodiment of the invention. In addition, in alternative embodiments, each of the drying steps may by accomplished by using microwave energy, convective heating or a combination thereof.

As mentioned above, in a preferred embodiment, the beans destined to be chopped are processed as described previously, and the beans destined to remain whole are processed separately. More specifically, the beans destined to remain whole are washed, cleaned, hydrated, and cooked separately from, but in a similar fashion to, the beans destined to be chopped. Thus, for example, the beans destined to remain whole are hydrated and cooked in the apparati depicted in FIGS. 9 and 1, respectively, using substantially the same steps, but a different temperature/pressure/time profile, than that used for the beans destined to be chopped.

Once cooked, the whole beans are arranged into a stack having multiple bean layers, and then dried using microwave energy, convective heating, or a combination of microwave and convective energy. In a preferred embodiment, the stack of beans is at least 1⅜ inches high (containing at least 4 layers) and is dried using a combination microwave/convection dryer. As was noted previously in connection with drying the sheet of texturized composition, the microwave energy input allows the drying step to proceed at high throughput rates. As is discussed more fully herein, adjustment of the convection air temperature, on the other hand, allows a significant degree of control over the rate of incidence of bird mouthing in the whole beans.

Once the whole beans have been dried, they are mixed with the chunks (from the first portion) to produce a dried refried bean product with enhanced textural, eating, and operational characteristics (e.g., speed of reconstitution).

Examples set forth below further illustrate various aspects of the present invention:

EXAMPLE 1

12 liters of hot water were placed in a small (8 inch diameter by 24 inch long) horizontal cylindrical cooking vessel. The water was then further heated to 185° F. by passing steam through the shaft of the central baffle, while slowly rotating the baffle so as to agitate the water.

Approximately 4000 ml of the hot water was drained from the vessel, and 7 lb. of dry pinto beans were then placed in the vessel—one half of these beans being distributed along one side of the baffle, and the remaining half on the other side of the baffle.

The vessel was then maintained at atmospheric pressure, and the baffle was alternately and continuously slowly rotated for one (1) minute each in the clockwise and counterclockwise directions. Steam was added through the baffle shaft to maintain the bean/water mixture temperature between approximately 180° F. and 190° F. The beans immediately started to absorb the hot water, and the rotating baffle served to mix and contact the beans with a continuously diminishing quantity of water. This hydration step was continued for 20 minutes, after which approximately 6700 ml of broth was drained from the now partially-hydrated beans. 75 grams of salt was then dissolved in 600 ml of the drained broth and this salt solution was returned to the cooking vessel.

The hatch to the cooking vessel was now secured and the vessel pressurized with steam and held at a pressure of 10 psig for 40 minutes in order to cook the beans. During this cooking period, the cooking vessel baffle continued to rotate alternatively and slowly for one (1) minute each in the clockwise and counterclockwise directions. In this manner, all the beans were contacted with the remaining and continuously reducing broth volume.

At the end of the cooking step, the vessel was depressurized and the cooked beans with very little remaining liquid broth were discharged into a holding vessel.

These cooked beans were then chopped and texturized by a small electrically driven meat grinder, which had a front plate with ¼ inch holes and knife cutters which rotated against the inner side of the front plate.

The cooked beans were manually fed into the grinder and the textured bean mass collected as it exited through the grinder front plate.

The textured bean mass was then placed in a cylindrical vessel, and was shaped into a sheet approximately ⅛ inch in thickness and 4 inches wide by applying pressure to the vessel so as to force the bean mass through a ⅛ inch by 4 inch slot situated at the base of the vessel.

As the textured bean mass exited the slot, it was continuously deposited on 6-inch by 6-inch perforated metal squares.

These perforated metal squares, supporting the wet bean sheet, were transferred and placed on a conveyor that passes through a convective dryer.

The bean sheet was initially dried for 3 minutes and 45 seconds using 400° F. hot air impinging on the top and bottom of the bean sheet.

The partially-dried beans were then broken into smaller pieces, placed on the perforated metal supporting squares, and finally dried for 4 minutes in the same convective dryer using 350° F. hot air.

After cooling, these dried, textured beans were stored for rapid reconstitution with water, and subsequent use in food items.

EXAMPLE 2

A dehydrated refried bean product mix was prepared according to FIG. 7.

First, the "texturized composition" portion of the mix was made by placing 200 lbs. of dry raw, cleaned pinto beans in a vertical hydration vessel. The hydration vessel was equipped with a screen and liquid outlet so that the beans would be immersed in hydrating liquid throughout the hydration step. 600 lbs. of hot water were then continuously circulated through a heat exchanger and the bed of hydrating beans. For the first 30 minutes of the hydration, the recirculating hot water was maintained at approximately 190° F., and then the hot water was heated to approximately 203° F. and maintained at this temperature for an additional 85 minutes.

The hydration vessel was then first drained of broth. The beans were very uniformly hydrated (moisture of 61.3%) maintaining their whole-bean integrity and thus easily flowed out of the vessel through a 4-inch tube into a holding container.

The hydrated beans were transferred to a cooking vessel having a 4-ft. diameter and equipped with a central rotating baffle that extended to within 3 1/16 inch of the cooking vessel's walls.

The cooking vessel's baffle was placed in a horizontal position and the hydrated beans were placed on the baffle within the cooking vessel.

After eliminating the majority of the air in the cooker, the beans were then pressure cooked by direct steam injection for about 60 minutes, the first 10 minutes at 10 psig and the remaining time at 13 psig. The central rotating baffle was stationary during the entire cooking step so as to maintain the whole bean integrity.

After depressurizing the cooking vessel, the condensate (which was not in contact with the cooking beans) was first drained from the cooking vessel. The cooked soft whole pinto beans were then removed from the cooking vessel.

These cooked beans were then fed through a series of two cutter plates (the first having rectangular holes and the second having circular holes). In front of each cutter plate there was a flat 3-knived cutter rotating at approximately 150 rpm. Prior to the first cutter plate, vegetable oil was injected into the bean stream by a small piston pump.

The outlet from the second cutter was connected directly to a spreader horn, so that the texturized composition could immediately be shaped into a flat profile, 2-ft. wide, with a ¼ inch thick central layer having ¼ inch high by ¼ inch thick stripped ridges on top and bottom of the central layer (as in, e.g., FIG. 8C). This flat profile was continuously fed via a conveyor through a microwave/convection oven.

The conveyor moved through the oven at approximately 9 inches per minute, and about 2500 $ft.^3$/min. air at about 340–350° F. was recirculated through the oven.

The microwave power was set at about 42 kW and the texturized composition exiting the dryer was dried to a moisture of between 3%–8%. This dried composition was then broken into small pieces of between ¼ inch and $V_2$ inch in size.

A second portion of beans to be used as cooked whole beans in the final refried bean mix was prepared as follows.

Once again, 200 lbs. of dry raw beans were hydrated in a vertical hydration vessel for a total of about 110 minutes. These hydrated beans were then pressure cooked for 60 minutes, by placing them on the central baffle in the cooking vessel, which remained stationary throughout the cooking step. In this manner, the whole bean integrity of the soft cooked beans could be easily maintained.

After depressurization, the cooked whole beans were continuously fed by conveyor into a convection/microwave dryer. The beans were stacked in a layer 18 inches wide by 1⅜ inches high on the feed conveyor and fed through the dryer at about 8 inches per minute.

About 2900–3000 ft.$^3$/min. air at 230° F.–205° F. was recirculated through the dryer, while the microwave power was set at between about 55 and 57 kW.

The dried whole beans exiting the dryer were largely whole with only a small fraction "bird mouthed".

Beans from the broken-up texturized composition and those from the "whole" portion were dry mixed in the ratio of 70/30 and approximately 3.5% salt was added to the dry mix.

This dry mix, rapidly rehydrated with hot water produced a very well liked refried bean product.

Additional drying experiments conducted in connection with the present invention may be summarized by the following examples. It is noted that, in all the following experiments, cooked beans having a moisture level of either about 70% by weight (see Examples 3–17) or about 58% by weight (see Examples 18–22) were used as starting material. For the latter, raw whole beans were cleaned, washed, and then cooked using the apparatus depicted in FIGS. 1–3 herein.

A batch convection/microwave oven was used in Examples 3–22. When operating in the convection/microwave mode, the oven is set up to provide intermittent microwave power (of approximately 0.6 kilowatts for approximately 40% of the time). The convection system, on the other hand, circulates hot air at a defined temperature, and is on "continuously", in the sense that, when the microwave mode is "off" (and the convection mode in "on"), energy is supplied to the heating elements of the convection oven, and fans (or blowers) blow the hot air through and around the mass of beans inside the chamber. However, when the microwave mode in "on", energy is no longer supplied to the heating elements, but the fans continue to operate, so that hot air inside the chamber is still forced through (and around) the mass of beans. Thus, during dehydration, convective heating is supplied in such a way as to generate and circulate hot air when microwave heating is not applied, and to circulate existing hot air, without generation of further convective heat, when microwave heating is applied.

When the convection/microwave oven is operated solely in the convection mode, the hot air at a defined temperature is simply recirculated around and through the product, and no microwave energy is applied.

EXAMPLE 3

A square microwave dish (6 in. on each side, and 1½ in. deep) was used to place about 244 grams of cooked whole beans inside a combination microwave-convection heating oven. With this setup, the beans arranged themselves in about 2–2½ layers within the dish.

The cooked beans had a moisture level of about 70%. The beans were first exposed to full microwave energy for a period of 3½ minutes (to heat them from room temperature to 212° F.). Next, the beans were dried using both microwave and convective energy for a period of approximately 12 minutes with the convective air temperature set at 250° F. During this time interval, microwave heating was supplied intermittently, for a total of approximately 40% of the time. In addition, the convection mode was fully "on" when the microwave mode was "off", and only partially "on" (i.e., fans continued to operate, so that hot air inside the oven was forced through and around the mass of beans) when the microwave mode was "on". At the end of this 12-minute time interval, the cooked whole bean material remaining in the dish weighed about 120 grams.

At this time, the beans were mixed, and then dried again in the oven for an additional period of about 8 minutes. This latter drying process was also carried out with the same combination microwave-convective heating procedure (with air temperature set at 250° F.) as that which was performed for the above-described 12-minute time period. At the end of the 8-minute time period, a total weight of about 82 grams of dried whole bean material remained. This included about 6 grams, or about 7.3%, of dried beans that were visually identified as being "bird mouthed".

EXAMPLE 4

The experiment of Example 3 was repeated, with the difference that the drying process was carried out using convective air set at 350° F., rather than at 250° F. Starting with 236 grams of cooked beans, the beans were first heated solely with microwave energy for 3½ minutes, and then for successive 12-minute and 8-minute periods using both microwave and convective heating as described in Example 3. This resulted in 76 grams of dried whole bean material, of which 14 grams, or about 18.4%, were identified as being bird mouthed.

EXAMPLE 5

The experiment of Example 3 was repeated, with the difference that only about one-half as much starting material was used, such that the beans arranged themselves in a single layer. This resulted in a shorter heating time, as well as about double the amount of microwave energy per unit mass of beans. Using the same dish as in Example 3, this resulted in only one layer of beans.

Thus, about 112 grams of beans were exposed to microwave energy for about 3½ minutes. This was then followed by an 11-minute period of both microwave and convective heating using air set at 250° F. The 41 grams of bean material remaining at the end of this period contained about 11 grams, or about 27%, of dried beans identified as being bird mouthed.

EXAMPLE 6

The experiment of Example 3 was repeated, with the difference that only microwave energy was used to dry the beans. Thus, 254 grams of cooked beans were exposed to full microwave power for 3½ minutes, followed by a 12-minute exposure to microwave energy with the power set at 40%. The beans were then mixed and dried for an additional 12 minutes using only microwave energy with the power similarly set at 40%. The 84 grams of dried bean material remaining at the end of this period contained about 13 grams, or about 15.5%, of visually-identified bird-mouthed beans.

EXAMPLE 7

100 grams of cooked beans were placed on a perforated rotating plate and exposed only to convection air heating set at 350° F. for successive 15-minute and 20-minute time periods. No microwave energy was applied. Thirty five minutes were needed to dry the beans. At the end of 35 minutes, all 39 grams (i.e., 100%) of the dried beans were bird-mouthed.

The following observations may be made based on the results of the experiments summarized in Examples 3–7 above. First, when convection is used exclusively to dry the high initial-moisture (about 70%) beans, the incidence of bird mouthing is higher than when either microwave energy, or a combination of convective heating and microwave energy are used. Thus, the pure convection experiment of Example 7 resulted in almost 100% bird mouthing, whereas the experiments of Examples 3, 4 and 6 resulted in only about 7.3%–18.4% bird mouthing. In addition, dehydration using microwave and convection heating requires less time than when pure convection is used.

Second, as evidenced by the results of Examples 3 and 4, dehydration of the beans using a combination of convection heating (with the air set at 250° F.) and microwave energy results in much less bird mouthing than when the same process is carried out at 350° F. As such, it is more advantageous to use lower initial temperatures in the "dual mode" process in order to avoid over-heating the beans.

Third, even when the "dual mode" process is carried out at 250° F., increasing the amount of microwave energy to which the beans are exposed results in a much larger bird-mouthing percentage due to overheating of the beans. This can be seen by a comparison of the results of Examples 3 and 5.

The following experiments were conducted in order to explore the significance of the thickness of the bean layer as the beans are being dried, as well as to compare the use of pure microwave energy, as opposed to a combination of convection heating and microwave energy, to dry the beans.

EXAMPLE 8

Similar to the experiment of Example 6, only microwave energy was used to dry 224 grams of cooked beans in an "open" dish (i.e., 6 in. on each side, and having no walls). With this configuration, the beans arranged themselves into approximately 1–2 layers. After the initial 3½-minute (full microwave power) period, the beans were dried for 12 minutes, then mixed and dried for an additional 8 minutes with the microwave power set at 40%. Of the 72 grams of bean material remaining at the end of this period, about 23 grams, or about 32%, of the dried beans were bird-mouthed.

EXAMPLE 9

The experiment of Example 8 was repeated, except that a large bowl having a base diameter of 6 inches, a top diameter of 7 inches, and a depth of 4½ inches was used, which resulted in 2 2½ bean layers. After the 23½-minute dehydration period, about 32% of the dried beans were bird-mouthed.

EXAMPLE 10

The experiment of Example 9 was repeated (i.e., deep bowl 2–2½ bean layers), except that a combination of both microwave energy and convection heating with the air temperature set at 250° F. was used to dry the beans. After 23½ minutes (3½+12+8 minutes), the dried beans exhibited a bird-mouthed rate of about 25%.

EXAMPLE 11

The experiment of Example 8 was repeated (i.e., open dish, 1–2 layers), except that the beans were dried using a combination of convection heating (with the air set at 250° F.) and microwave energy. With the beans again arranging themselves in about 1–2 layers, after 23½ minutes (3½+12+8 minutes) and drying at about 250° F., the dried beans exhibited a bird-mouthed rate of about 33%.

EXAMPLE 12

Beans were placed in a small bowl (about 4½ inches in diameter and 3½ inches deep), where they arranged themselves in 4–5 layers. The beans were dried using a combination of both convection heating (with the air set at 250° F.) and microwave energy. After 23½ minutes (3½+12+8 minutes), the dried beans exhibited a bird-mouthed rate of about 11%. This experiment was repeated a second time, with a bird-mouthed rate of about 8%.

EXAMPLE 13

The experiment of example 12 was repeated, except that only microwave energy (at 40% power level) was applied. After 23½ minutes (3½+12+8 minutes), the dried beans exhibited a bird-mouthed rate of about 10%.

EXAMPLE 14

In order to assess the impact of drying under high humidity conditions, a large container having a diameter of 8½ inches, a depth of 1½ inches, and a lid having 8 transverse ⅛-inch holes was used to dry beans with microwave energy only. Beans were placed in the container and the lid used to cover the container. The beans, which arranged themselves in only 1 layer, were first dried for 3½ minutes at full power, followed by a 12-minute period with the microwave at about 40%. The beans were then mixed and dried for an additional 11 minutes using the microwave at about 40%. The dried beans exhibited about 14% bird mouthing.

EXAMPLE 15

The experiment of Example 14 was repeated with the lid removed. At the end of 26½ minutes, the dried beans exhibited about 30% bird mouthing.

EXAMPLE 16

A flat bowl (6 inches on each side, and 1¾ inches deep) was used to place about 230 grams of cooked whole beans inside a combination microwave-convection heating oven. With this setup, the beans arranged themselves in about 2–2½ layers within the bowl.

The beans were first exposed to full microwave power for a period of 3½ minutes. Next, the beans were dried for a period of approximately 12 minutes using both microwave energy (with power set at 40%) and convective heating (with the air temperature set at 250° F.). The beans were then mixed and dried for an additional 8-minute period. Of the remaining 63 grams of bean material about 9 grams, or about 14.3%, of the beans exhibited bird mouthing.

EXAMPLE 17

The experiment of Example 16 was repeated, with the difference that only microwave energy was used to dry the beans. After 23½ minutes (3½+12+8 minutes), the dried beans exhibited a bird-mouthed rate of about 27%.

The following observations may be made based on the results of the experiments summarized in Examples 8–17 above. First, when the beans are arranged in about 1–2 layers, dehydration with pure microwave energy as opposed to a combination of convective heating and microwave energy yields similar results. Thus, in Examples 8 and 11, 32% and 33%, respectively, of the beans were bird-mouthed.

Second, with 4–5 bean layers, dehydration with either pure microwave energy or a combination of convective heating and microwave energy yields very attractive results. Thus, Examples 12 and 13 indicate that, with multiple layers, especially in the range of 4–5 layers, a bird-mouthed rate of 8%–11% may be achieved.

Third, when the beans are arranged in 2–2½ layers in such a way that the effect of convection heating is either minimized or eliminated, dehydration using either pure microwave energy or a combination of convective heating and microwave energy yields similarly high bird-mouthed rates. Thus, in Examples 9 and 10, the relatively deep bowl in which the beans were dried nullifies the effect of convection heating, such that bird mouthing in the range of 25%–32% is observed.

Fourth, when the beans are arranged in 2–2½ layers, and the effect of convection heating is not minimized or eliminated, dehydration with a combination of convective heating and microwave energy yields more advantageous results than dehydration with pure microwave energy. Thus, the experiment of Example 16 resulted in a bird-mouth rate (14.3%) that was about half as much as that achieved in the experiment of Example 17 (i.e., about 27%).

Finally, when the beans are arranged in a single layer, as in Examples 14 and 15, dehydration of the beans in the presence of a higher amount of humidity provides better results. Thus, in the experiment of Example 14, a 14% bird-mouthing rate was achieved, compared to about 30% in the experiment of Example 15.

For purposes of comparison with the results of the above experiments, the following experiments were carried out using beans having a lower initial moisture content of about 58% that were cooked using the apparatus depicted in FIGS. 1–3 herein:

EXAMPLE 18

A flat dish (6 in. on each side, and having no walls) was used to place about 188 grams of cooked whole beans inside a combination microwave-convection heating oven. With this setup, the beans arranged themselves in about 1–2 layers within the dish.

The beans were first exposed to full microwave energy for a period of 3½ minutes. Next, the beans were dried for a period of approximately 12 minutes using both microwave and convective heating with the circulating air temperature set at 250° F. During this time interval, microwave heating was supplied intermittently, for a total of approximately 40% of the time. In addition, the convection mode was fully "on" when the microwave mode was "off", and only partially "on" (i.e., fans continued to operate, so that hot air inside the oven was forced through and around the mass of beans) when the microwave mode was "on". At the end of this 12-minute time interval, the cooked whole bean material remaining in the dish weighed about 82 grams.

At this time, the beans were mixed, and then heated again in the oven for an additional period of about 3 minutes. This latter heating process was also carried out using circulating air temperature set at 250° F., with the same combination microwave-convective heating procedure as that which was performed for the above-described 12-minute time period. At the end of the 3-minute time period, a total weight of about 77 grams of cooked whole bean material remained. This included about 8 grams, or about 10%, of the dried beans exhibiting a bird mouthed effect.

EXAMPLE 19

The experiment of Example 18 was repeated, with the difference that the successive 12- and 3-minute drying stages were carried out using circulating air temperature set at 225° F. rather than at 250° F. The dried beans exhibited a bird-mouthed rate of about 9%.

EXAMPLE 20

190 grams of cooked whole beans were placed on a flat dish (6 in. on each side, and having no walls), such that the beans arranged themselves in about 1–2 layers within the dish. The beans were exposed only to microwave energy at full power for an initial period of 3½ minutes, followed by 12 minutes of microwave energy at about 40% power (as explained above). The beans were then dried for an additional period of 4 minutes, again using solely microwave energy at about 40% power. At the end of the 19½-minute process, the dried beans exhibited a bird-mouthing rate of about 16%.

EXAMPLE 21

188 grams of beans were placed in a large container having a diameter of 8½ inches and a depth of 1½ inches, and the container was closed with a lid having 8 transverse ⅛-inch holes. The beans, which arranged themselves in only 1 layer, were dried using microwave energy only. The beans were first dried for 3½ minutes at full microwave power, followed by a 12-minute period with the microwave at about 40%. The beans were then dried for an additional period of 4 minutes, again using solely microwave energy at about 40% power. At the end of the 19½-minute process, the dried beans exhibited a bird-mouthing rate of about 5%.

EXAMPLE 22

188 grams of beans were placed in a small bowl (about 4½ inches in diameter and 3½ inches depth), where they arranged themselves in 4–5 layers. Using microwave energy only, as in Examples 20 and 21, the beans were first dried for 3½ minutes, followed by a 12-minute period with the microwave at about 40%. At the end of the 15½-minute process, the dried beans exhibited almost no bird-mouthing at all.

The following observations may be made based on the results of the experiments summarized in Examples 18–22 above. First, dehydration of cooked beans having a higher initial moisture content results in a higher rate of bird mouthing in the dried bean product. Thus, for instance, the experiments of Examples 8 and 11, in which beans having an initial moisture content of about 70% were used, yielded bird-mouthing rates of about 32–33%. In contrast, the experiments of Examples 18 and 20, in which beans having an initial moisture content of about 58% were used, yielded bird-mouthing rates of about 10–16%.

Second, with multiple bean layers, and in particular, with 4–5 bean layers, bird mouthing of the beans can be essentially eliminated. See, e.g., Example 22. In addition, as evidenced by the results of the experiment of Example 22, dehydration of the beans can be achieved in a shorter amount of time than would be possible with either pure convection heating or drying with 1–2 bean layers. In this regard, the experiment of Example 20, for instance, in which the beans arranged themselves in 1–2 layers, required 19½ minutes to dry the beans using microwave energy. In contrast, the experiment of Example 22 required only about 15½ minutes to accomplish the same task.

Third, as shown by a comparison of the results of the experiments of Examples 20, 21, and 22, the incidence of bird mouthing can also be reduced by drying the beans in a higher-humidity environment. Thus, the experiment of Example 21 resulted in only about 5% of the beans exhibiting bird mouthing, as opposed to about 16% in the experiment of Example 20. In addition, this reduction in bird mouthing can be achieved in a shorter amount of time (i.e., in this case, 19½ minutes) than would be possible with pure convection heating. Nevertheless, the higher-humidity dehydration process summarized in Example 21 is still slower than the larger-bean-layer dehydration process summarized in Example 22. Thus, it appears that, although either higher humidity conditions or larger bean layers may be used to decrease bird-mouthing rates, the dehydration process is faster when multiple bean layers are used.

Finally, with 1–2 layers of beans, dehydration using a combination of convective heating and microwave energy appears to be a slightly faster process than dehydration using pure microwave energy. Thus, the experiment of Example 18 took about 18½ minutes to complete and resulted in a bird-mouthing rate of about 10%. The experiment of Example 20, on the other hand, took about 19½ minutes to complete and resulted in a bird-mouthing rate of about 16%.

In this regard, and for purposes of comparison, beans from both moisture categories, i.e., those having an initial moisture content of about 58% (that were cooked using the apparatus depicted in FIGS. 1–3 herein) and those having an initial moisture content of about 70% were separately dried in a continuous impingement convection oven (e.g., Lincoln impingement oven) using convection only. In both cases, the beans were placed on a teflonized perforated plate (12 in.×12 in.), where they arranged themselves in about 1–1½ layers. The beans were then dried for just over 10 minutes at 235° F., followed by 8½ minutes at 265° F., and 9¼ minutes at 300° F drying time was about 28 minutes.

In several experiments carried out according to the above conditions, at the end of the 28-minute period, the lower-moisture-content beans exhibited a bird-mouthing rate in the 21%–24% range. In contrast, the beans having a higher moisture content exhibited almost 100% bird mouthing. Comparison of these results with those of the above-described Examples indicates that, while drying the lower-moisture-content beans using solely convective heating may result in slightly higher drying times, it does, nevertheless, allow for bird-mouthing rates that are below 25%, i.e., where a substantial fraction of the dried whole beans preserve their structural integrity.

All in all, the above experiments point to an extremely attractive, and surprising, result: dehydration of beans in larger layers using either pure microwave energy or a combination of convective heating and microwave energy provides not only lower bird-mouthing rates, but also higher throughput. Thus, embodiments of the present invention provide for an industrial solution whereby more beans can be produced in a shorter amount of time, with a substantial fraction of the beans retaining their structural integrity.

In this regard, embodiments of the invention may employ a heating chamber allowing continuous product passage therethrough, rather than a traditional convection/microwave oven. Thus, for example, a heating chamber capable of providing convective heating and/or microwave energy may be equipped with a conveyor or other similar means for continuously advancing the beans through the chamber. In this configuration, the speed of the conveyor will be determined by the number of bean layers, the exposure temperature, the required duration of exposure, the level of humidity within the chamber, etc.

Embodiments of the present invention are also directed to a method of producing a reconstitutable dehydrated chunky bean product so as to substantially eliminate hard beans from the bean product, wherein dried whole beans produced by the methods described immediately above so as to be substantially free of bird-mouthing effects can be added at various points within the process outlined in FIG. 6. In this way, a reconstitutable dehydrated bean product may be produced that has an improved amount of chunkiness and home-made feel due to the existence of actual, structurally intact, whole beans in the final, reconstituted product. In addition, as shown in FIG. 7 for illustrative purposes, additives such as salt, colorant, flavor ingredients, and/or oil may be added to either portion of beans at various points (e.g., prior to cooking, prior to chopping, etc.).

It will be apparent to a person of ordinary skill in the art that embodiments of the present invention are not limited in their design or application to specific embodiments disclosed herein. For example, injection of steam into the stationary pressure vessel may be accomplished through ports in the vessel walls. In addition, while the steps of embodiments of the methodology lend themselves to dried legumes, other food-stuffs (e.g., carrots, celery, meats, chicken, fish and the like) are also within the scope of the present invention. Thus, the present invention is intended to encompass all of the embodiments disclosed and suggested herein as defined by the claims appended hereto and any equivalents thereof.

What is claimed is:

1. A method for producing a reconstitutable dehydrated chunky bean product so as to substantially eliminate hard beans from the bean product, the method comprising:

a. separately hydrating first and second portions of raw beans by maintaining the entirety of said first and second portions submerged in a wetting liquid for respective first and second hydration periods so as to obtain respective first and second portions of unchopped hydrated beans;

b. separately cooking each of said first and second portions of hydrated beans to obtain respective first and second portions of unchopped cooked beans;

c. chopping said first portion of the cooked beans to form a composition of a desired texture;

d. forming the texturized composition into a generally flat sheet;

e. drying the flat sheet of texturized composition;

f. forming the sheet into chunks;

g. drying the second portion of unchopped cooked beans using microwave energy; and h. adding the dried second portion of unchopped cooked beans to said chunks.

2. The method of claim 1, further including adding to at least one of said first and second portions of hydrated beans at least one member selected from the group consisting of flavor ingredients, oil, and colorant.

3. The method of claim 1, wherein, step (a) takes place in a hydration vessel and, at least one member selected from the group consisting of flavor ingredients, oil, colorant, and a concentrated or reconstituted broth removed from the hydration vessel is added to said first portion of beans.

4. The method of claim 1, wherein, in step (g), the second portion of unchopped cooked beans is dried using convective heating in addition to said microwave energy.

5. The method of claim 1, wherein said first and second portions of hydrated beans are cooked in a stationary cooking vessel.

6. The method of claim 1, wherein the generally flat sheet of texturized composition has a top surface and a bottom surface and at least one of said top and bottom surfaces is ribbed.

7. The method of claim 1, wherein, in steps (a) and (b), said first portion of raw beans is hydrated and cooked under a first set of processing conditions and said second portion of raw beans is hydrated and cooked under a second, different set of processing conditions.

8. A method for producing a reconstitutable dehydrated chunky bean product so as to substantially eliminate hard beans from the bean product, the method comprising:

a. separately hydrating first and second portions of raw beans by maintaining the entirety of said first and second portions submerged in a wetting liquid for respective first and second hydration periods so as to obtain respective first and second portions of unchopped hydrated beans;

b. separately cooking each of said first and second portions of hydrated beans to obtain respective first and second portions of unchopped cooked beans;

c. chopping said first portion of the cooked beans to form a composition of a desired texture;

d. forming the texturized composition into a generally flat sheet;

e. drying the flat sheet of texturized composition;

f. forming the sheet into chunks;

g. arranging the second portion of unchopped cooked beans into a stack of multiple bean layers;

h. drying said layers of unchopped cooked beans using microwave energy; and i. adding the dried second portion of unchopped cooked beans to said chunks.

9. The method of claim 8, further including adding to at least one of said first and second portions of hydrated beans at least one additive selected from the group consisting of flavor ingredients, oil and colorant.

10. The method of claim 8, wherein, step (a) takes place in a hydration vessel and, at least one member selected from the group consisting of flavor ingredients, oil, colorant, and a concentrated or reconstituted broth removed from the hydration vessel is added to said first portion of beans.

11. The method of claim 8, wherein, in step (e), the sheet of texturized composition is dried by exposure to both microwave energy and convective heating.

12. The method of claim 8, wherein the generally flat sheet of texturized composition has a top surface and a bottom surface and at least one of said top and bottom surfaces is ribbed.

13. The method of claim 8, wherein, in steps (a) and (b), said first portion of raw beans is hydrated and cooked under a first set of processing conditions and said second portion of raw beans is hydrated and cooked under a second, different set of processing conditions.

14. The method of claim 8, wherein, in step (h), the layers of unchopped cooked beans are dried using convective heating in addition to said microwave energy.

15. The method of claim 8, wherein said first and second portions of hydrated beans are cooked in a stationary cooking vessel.

16. The method of claim 8, wherein, in step (g), said stack has at least four layers.

17. The method of claim 8, wherein the hydrating step is preceded by washing and cleaning the raw beans, said hydrating step being carried out by a process comprising, for each of said first and second portions of raw beans:

placing the raw beans into a stationary hydration vessel;

introducing a defined quantity of wetting liquid into the hydration vessel to establish a liquid level such that all of the beans are immersed in the liquid;

capturing, at a location below said liquid level, harder beans that buoy up towards an upper portion of the hydration vessel;

circulating said wetting liquid through the beans within the hydration vessel for said respective hydration period;

after said hydration period, removing a broth from the hydration vessel, wherein the broth is comprised of an unabsorbed portion of the wetting liquid and a proportion of bean solids; and recovering said bean solids from said broth.

18. The method of claim 17, further including:

after said hydration period, removing softer beans that have sunk towards a lower end of the hydration vessel; and removing said harder beans from a point below said capturing location.

19. The method of claim 17, wherein, after the bean solids are recovered, the unabsorbed portion of the liquid is re-introduced into the hydration vessel to be used in hydrating a subsequent batch of beans.

20. The method of claim 18, wherein, after removal, the captured, harder beans are returned to the hydration vessel to be further hydrated with a subsequent batch of beans.

21. The method of claim 17, wherein said recovery of bean solids from the broth is accomplished by one or more means selected from the group consisting of spray drying, evaporation, and filtration.

22. The method of claim 17, further including recovering one or more flavors from the broth.

23. The method of claim 17, wherein said hydration is carried out at a temperature between about 180 and about 210° F. and said respective hydration period lasts between 40 and 150 minutes.

24. The method of claim 17, wherein said harder beans are captured with a mesh screen and removed through a release valve.

25. The method of claim 17, wherein the bean solids separated from the broth are added to a respective portion of the beans after the hydration step.

26. A method of hydrating a batch of raw beans having a variety of initial moisture contents, comprising:

a. placing the raw beans into a hydration vessel;

b. introducing a defined quantity of wetting liquid into the hydration vessel to establish a liquid level such that all of the beans are immersed in the liquid;

c. capturing, at a location below said liquid level, beans that buoy up towards an upper portion of the hydration vessel;

d. circulating said wetting liquid through the beans within the hydration vessel for a predetermined hydration period;

e. after said hydration period, removing a broth formed from said liquid and beans from the hydration vessel; and f. removing the now hydrated beans from the hydration vessel.

27. The method of claim 26, wherein the broth is comprised of an unabsorbed portion of the wetting liquid and a proportion of bean solids *dissolved from the raw beans being hydrated*, the method further including recovering said bean solids from the broth.

28. The method of claim 27, wherein said recovery of bean solids is accomplished by one or more means selected from the group consisting of spray drying, evaporation, and filtration.

29. The method of claim 27, wherein, after the bean solids are recovered, the unabsorbed portion of the liquid is re-introduced into the hydration vessel to be used in hydrating a subsequent batch of beans.

30. The method of claim 26, wherein during step (c) harder beans are captured and returned to the hydration vessel to be further hydrated with a subsequent batch of beans.

31. The method of claim 30, wherein said harder beans are captured with a mesh screen and removed through a release valve.

32. The method of claim 26, further including recovering one or more flavors from the broth.

33. The method of claim 26, wherein said hydration vessel is stationary and generally vertically elongated.

34. A method for producing a reconstitutable dehydrated bean product, comprising:

a. hydrating a first portion of raw beans by maintaining said portion submerged in a wetting liquid for a desired hydration period so as to obtain a first portion of hydrated beans;

b. cooking said first portion of hydrated beans to obtain a first portion of cooked beans;

c. chopping said first portion of cooked beans to form a composition of a desired texture;

d. forming the texturized composition into a generally flat sheet;

e. drying the flat sheet of texturized composition; and f. forming said sheet into chunks.

35. A method for producing a reconstitutable dehydrated bean product, comprising:

a. hydrating a first portion of raw *whole* beans by maintaining said portion submerged in a wetting liquid for a desired hydration period so as to obtain [a first portion of hydrated beans wherein the wetting liquid is selected from the group consisting of water and a broth of water and bean solids] *hydrated beans and a broth, said broth including water and bean solids dissolved from the raw whole beans being hydrated*;

b. [cooking said first portion of hydrated beans to obtain a first portion of cooked beans; and] *removing a portion of said broth and subdividing the removed broth into a first removed portion and a second removed portion, wherein said second removed portion remains unused through subsequent steps of the method and is of an amount sufficient to reduce flatulent sugars in said reconstitutable dehydrated bean product;*

*c. adding said first removed portion to said hydrated beans and cooking the hydrated beans by steam to obtain cooked beans, wherein said first removed portion is of an amount such that:*

*(i) at least one of a flavor ingredient and a colorant is deliverable therein for addition to the hydrated beans being cooked; and*

*(ii) at the end of the cooking step, substantially all of the water from said first removed portion has been absorbed by the cooked beans; and*

[c] *d.* drying the cooked beans using microwave energy such that the beans substantially maintain their *whole bean* shape.

36. The method of claim 34, further including adding to said first portion of hydrated beans at least one member selected from the group consisting of flavor ingredients, oil and colorant.

37. The method of claim 34, wherein, step (a) takes place in a hydration vessel and, at least one member selected from the group consisting of flavor ingredients, oil, colorant, and a concentrated [or reconstituted] broth removed from the hydration vessel is added to said beans.

38. The method of claim 35, wherein, in step [step (c)] *step (d)*, the cooked beans are dried using convective heating in addition to said microwave energy.

39. The method of claim 34, wherein said hydrated beans are cooked in a stationary cooking vessel.

40. The method of claim 35, wherein said hydrated beans are cooked in a stationary vessel.

41. The method of claim 34, wherein the generally flat sheet of texturized composition has a top surface and a bottom surface and at least one of said top and bottom surfaces is ribbed.

42. The method of claim 1, wherein step (g) comprises drying the second portion of unchopped cooked beans using microwave energy such that the beans substantially maintain their shape.

43. The method of claim 8, wherein step (h) comprises drying the layers of unchopped cooked beans using microwave energy such that the beans substantially maintain their shape.

*44. A method for producing a reconstitutable dehydrated bean product, comprising:*

*a. hydrating raw beans in a wetting liquid for an amount of time sufficient to obtain hydrated beans and a broth, said broth including water and bean solids dissolved from the raw beans being hydrated;*

*b. removing a portion of said broth and subdividing the removed broth into a first removed portion and a second removed portion, wherein said second removed portion remains unused through subsequent steps of the method and is of an amount sufficient to reduce flatulent sugars in said reconstitutable dehydrated bean product;*

*c. adding said first removed portion to said hydrated beans and cooking the hydrated beans by steam to obtain cooked beans, wherein said first removed portion is of an amount such that:*

*(i) at least one of a flavor ingredient and a colorant is deliverable therein for addition to the hydrated beans being cooked; and*

*(ii) at the end of the cooking step, substantially all of the water from said first removed portion has been absorbed by the cooked beans;*

*d. producing a texturized bean composition with a desired consistency from said cooked beans; and*

*e. drying the texturized bean composition to produce a reconstitutable dehydrated bean product with reduced flatulent sugars.*

*45. The method of claim 44, wherein, in step (a), said raw beans are hydrated in a stationary vessel.*

*46. The method of claim 44, further including adding at least one member selected from the group consisting of a flavor ingredient, colorant, and oil to said beans.*

*47. The method of claim 44, further including recovering said bean solids from the broth obtained in step (a) by one or more means selected from the group consisting of spray drying, evaporation, and filtration.*

*48. The method of claim 44, further including recovering one or more flavors from the broth obtained in step (a).*

*49. The method of claim 44, wherein, in step (c), said hydrated beans are cooked in a stationary vessel.*

*50. The method of claim 44, further including forming the dried bean composition into chunks.*

*51. The method of claim 44, wherein said composition includes at least some pieces of cooked beans.*

*52. The method of claim 44, wherein, in step (d), said texturized bean composition is produced by chopping the cooked beans.*

*53. The method of claim 52, wherein said composition includes at least some pieces of cooked beans.*

*54. The method of claim 44, wherein said texturized bean composition is formed into a sheet having one or more ribbed surfaces.*

*55. The method of claim 44, wherein, in step (d), said texturized bean composition is produced by cutting the cooked beans, and wherein the composition includes at least some pieces of cooked beans.*

*56. The method of claim 44, wherein, in step (d), said texturized bean composition is produced by urging the cooked beans through a perforated plate.*

*57. The method of claim 56, wherein said texturized bean composition is formed into a sheet having one or more ribbed surfaces and includes at least some pieces of cooked beans.*

*58. A method for producing a reconstitutable dehydrated bean product, comprising:*

*a. hydrating raw beans in a vessel with a wetting liquid to obtain hydrated beans and a broth, said broth including bean solids dissolved from the raw beans being hydrated;*

*b. removing a first portion of the broth from the vessel and retaining a second portion of the broth in the vessel, wherein said first portion remains unused through subsequent steps of the method and is of an amount sufficient to reduce flatulent sugars in said reconstitutable dehydrated bean product, and wherein said second portion is of an amount sufficient to reduce yield loss in said reconstitutable dehydrated bean product;*

*c. using said second portion of the broth for hydrating subsequent raw beans;*

*d. cooking said hydrated beans to obtain cooked beans;*

*e. producing a texturized bean composition with a desired consistency from said cooked beans;*

*f. drying the texturized bean composition; and*

*g. forming the dried bean composition into chunks.*

*59. The method of claim 58, wherein, in step (e), said texturized bean composition is produced by chopping the cooked beans.*

*60. The method of claim 58, wherein said composition includes at least some pieces of cooked beans.*

*61. The method of claim 58, wherein said texturized bean composition is formed into a sheet having one or more ribbed surfaces.*

*62. The method of claim 61, wherein said composition includes at least some pieces of cooked beans.*

*63. The method of claim 58, further including depositing the texturized bean composition onto a moving conveyor prior to step (f).*

*64. The method of claim 58, wherein at least a proportion of said bean solids dissolved from the raw beans during hydration in step (a) is added back in concentrated form at a point subsequent to step (c) in the method.*

*65. The method of claim 58, further including recovering said bean solids from the broth obtained in step (a) by one or more means selected from the group consisting of spray drying, evaporation, and filtration.*

*66. The method of claim 58, further including recovering one or more flavors from the broth obtained in step (a).*

*67. The method of claim 58, wherein, in step (e), said texturized bean composition is produced by cutting the cooked beans, and wherein the composition includes at least some pieces of cooked beans.*

*68. The method of claim 58, wherein, in step (e), said texturized bean composition is produced by urging the cooked beans through a perforated plate.*

*69. The method of claim 58, wherein, in step (a), said raw beans are hydrated in a stationary vessel.*

*70. The method of claim 58, further including adding at least one member selected from the group consisting of a flavor ingredient, colorant, and oil to said beans.*

*71. The method of claim 58, wherein, in step (d), said hydrated beans are cooked in a stationary vessel.*

*72. The method of claim 58, wherein water is added to said second portion of said broth used for hydrating subsequent raw beans.*

*73. The method of claim 58, wherein, in step (a), said raw beans are hydrated in a first stationary vessel and, in step (d), said hydrated beans are cooked in a second stationary vessel.*

*74. A method for producing a reconstitutable dehydrated bean product, comprising:*

*a. hydrating raw beans to obtain hydrated beans and a broth, said broth including water and bean solids dissolved from the raw beans being hydrated;*

*b. removing a portion of said broth and subdividing the removed broth into a first removed portion and a second removed portion, wherein said second removed portion remains unused through subsequent steps of the method and is of an amount sufficient to reduce flatulent sugars in said reconstitutable dehydrated bean product;*

*c. adding said first removed portion to said hydrated beans and cooking the hydrated beans by steam to obtain cooked beans, wherein said first removed portion is of an amount such that:*

*(i) at least one of a flavor ingredient and a colorant is deliverable therein for addition to the hydrated beans being cooked; and*

*(ii) at the end of the cooking step, substantially all of the water from said first removed portion has been absorbed by the cooked beans;*

*d. producing a texturized bean composition with a desired consistency from said cooked beans, said composition including at least some pieces of cooked beans;*

*e. depositing the texturized bean composition onto a moving conveyor so as to form the texturized composition into a shape having one or more ribbed surfaces;*

*f. drying the texturized composition; and*

*g. forming the texturized composition into chunks.*

*75. The method of claim 74, wherein, in step (d), said texturized bean composition is produced by chopping the cooked beans.*

*76. The method of claim 74, wherein, in step (d), said texturized bean composition is produced by cutting the cooked beans.*

*77. The method of claim 74, wherein, in step (d), said texturized bean composition is produced by urging the cooked beans through a perforated plate.*

*78. The method of claim 74, further including adding at least one member selected from the group consisting of a flavor ingredient, colorant, and oil to said beans.*

*79. The method of claim 74, wherein, in step (a), said raw beans are hydrated in a first vessel, and in step (c), said hydrated beans are cooked in a second vessel.*

*80. A method for producing a reconstitutable dehydrated bean product, comprising:*

*a. hydrating raw whole beans in a vessel with a wetting liquid for an amount of time sufficient to obtain hydrated beans and a broth, said broth including bean solids dissolved from the raw beans being hydrated;*

*b. removing a first portion of the broth from the vessel and retaining a second portion of the broth in the vessel, wherein said first portion remains unused through subsequent steps of the method and is of an amount sufficient to reduce flatulent sugars in said reconstitutable dehydrated bean product, and wherein said second portion is of an amount sufficient to reduce yield loss in said reconstitutable dehydrated bean product;*

*c. using said second portion of the broth for hydrating subsequent raw beans;*

*d. steam cooking said hydrated beans to obtain cooked beans; and*

*e. drying the cooked beans using microwave energy such that the beans substantially maintain their whole bean shape.*

*81. The method of claim 80, wherein, in step (e), the cooked beans are dried using convective heating in addition to said microwave energy.*

*82. The method of claim 80, wherein, in step (a), said raw beans are hydrated in a stationary vessel.*

*83. The method of claim 80, wherein, in step (d), said hydrated beans are cooked in a stationary vessel.*

*84. A method for producing a reconstitutable dehydrated bean product, comprising:*

*a. hydrating raw whole beans in a wetting liquid for an amount of time sufficient to obtain hydrated beans and a broth, said broth including water and bean solids dissolved from the raw beans being hydrated;*

*b. steam cooking said hydrated beans in the presence of a first portion of said broth, wherein a second portion of said broth has been removed such that the cooked beans have reduced flatulent sugars, wherein the first portion of said broth is present in an amount that (i) at least one of a flavor ingredient and a colorant is deliverable therein for addition to the hydrated beans being cooked; and (ii) at the end of the cooking step, substantially all of the water from the first portion of said broth is absorbed by the cooked beans; and*

*c. drying the cooked beans using microwave energy such that the beans substantially maintain their whole bean shape.*

*85. The method of claim 84, wherein, in step (a), said raw beans are hydrated in a first vessel, and in step (b), said hydrated beans are cooked in a second vessel.*

*86. The method of claim 85, wherein at least one of said first and second vessels is stationary.*

*87. The method of claim 84, wherein, in step (c), the cooked beans are arranged into a stack of multiple bean layers and dried.*

*88. The method of claim 84, further including adding at least one member selected from the group consisting of a flavor ingredient, colorant, and oil to said beans.*

*89. The method of claim 84, further including recovering at least a proportion of said bean solids from the broth obtained in step (a) by one or more means selected from the group consisting of spray drying, evaporation, and filtration.*

*90. The method of claim 84, further including recovering one or more flavors from the broth obtained in step (a).*

*91. The method of claim 84, wherein said cooked beans have a moisture content of less than about 70%.*

*92. The method of claim 84, wherein, in step (c), the cooked beans are dried using convective heating in addition to said microwave energy.*

*93. A method for producing a reconstitutable dehydrated bean product, comprising:*

*a. hydrating raw whole beans in a wetting liquid for an amount of time sufficient to obtain hydrated beans and a broth, said broth including water and bean solids dissolved from the raw beans being hydrated;*

*b. steam cooking said hydrated beans in the presence of a first portion of said broth, wherein a second portion of said broth has been removed such that the cooked beans have reduced flatulent sugars, wherein the first portion of said broth is present in an amount that (i) at least one of a flavor ingredient and a colorant is deliverable therein for addition to the hydrated beans being cooked; and (ii) at the end of the cooking step, substantially all of the water from the first portion of said broth is absorbed by the cooked beans; and*

*c. drying the cooked beans using microwave energy and convective heating concurrently such that the beans substantially maintain their whole bean shape.*

*94. The method of claim 93, wherein, in step (a), said raw beans are hydrated in a first vessel.*

*95. The method of claim 94, wherein, in step (b), said hydrated beans are cooked in a second vessel.*

*96. The method of claim 95, wherein said second vessel is stationary.*

*97. The method of claim 93, further including adding at least one member selected from the group consisting of a flavor ingredient, colorant, and oil to said beans.*

*98. The method of claim 93, wherein at least a proportion of the bean solids from the broth obtained in step (a) is recovered by one or more means selected from the group consisting of spray drying, evaporation, and filtration.*

*99. The method of claim 93, further including recovering one or more flavors from the broth obtained in step (a).*

*100. The method of claim 94, wherein said first vessel is stationary.*

*101. The method of claim 93, wherein, in step (c), the cooked beans are dried at a temperature of approximately 212° F.*

*102. The method of claim 93, wherein said cooked beans have a moisture content of less than about 70%.*

*103. The method of claim 93, wherein, in step (c), the cooked beans are arranged into a stack of multiple bean layers and dried.*

*104. A method for producing a reconstitutable dehydrated bean product, comprising:*

*a. hydrating raw beans in a vessel with a wetting liquid to obtain hydrated beans and a broth, said broth including bean solids dissolved from the raw beans being hydrated;*

*b. removing a portion of the broth from the vessel and retaining the remainder of the broth in the vessel, wherein said remainder of the broth that is retained in the vessel is of an amount sufficient to reduce yield loss in said reconstitutable dehydrated bean product;*

*c. subdividing the removed portion of the broth into a first removed portion and a second removed portion,*

*wherein said second removed portion remains unused through subsequent steps of the method and is of an amount sufficient to reduce flatulent sugars in said reconstitutable dehydrated bean product;*

*d. using said remainder of the broth that is retained in the vessel for hydrating subsequent raw beans;*

*e. adding said first removed portion to said hydrated beans and cooking the hydrated beans by steam to obtain cooked beans, wherein said first removed portion is of an amount such that at least one of a flavor ingredient and a colorant is deliverable therein for addition to the hydrated beans being cooked;*

*f. producing a texturized bean composition with a desired consistency from said cooked beans;*

*g. depositing the texturized bean composition onto a moving conveyor; and*

*h. drying the texturized bean composition.*

*105. The method of claim 104, further including forming the dried bean composition into chunks.*

*106. The method of claim 104, further including adding at least one member selected from the group consisting of a flavor ingredient, colorant, and oil to said beans.*

*107. The method of claim 104, wherein water is added to said remainder of said broth used for hydrating subsequent raw beans.*

*108. A method for producing a reconstitutable dehydrated bean product, comprising:*

*a. hydrating raw beans in a vessel with a wetting liquid to obtain hydrated beans and a broth, said broth including bean solids dissolved from the raw beans being hydrated;*

*b. removing a portion of the broth from the vessel and retaining the remainder of the broth in the vessel, wherein said remainder of the broth that is retained in the vessel is of an amount sufficient to reduce yield loss in said reconstitutable dehydrated bean product;*

*c. subdividing the removed portion of the broth into a first removed portion and a second removed portion, wherein said second removed portion remains unused through subsequent steps of the method and is of an amount sufficient to reduce flatulent sugars in said reconstitutable dehydrated bean product;*

*d. using said remainder of the broth that is retained in the vessel for hydrating subsequent raw beans;*

*e. adding at least a proportion of bean solids from said first removed portion to at least one of steps (f)-(h) in the method;*

*f. cooking said hydrated beans to obtain cooked beans;*

*g. producing a texturized bean composition with a desired consistency from said cooked beans; and*

*h. drying the texturized bean composition.*

*109. The method of claim 108, further including forming the dried bean composition into chunks.*

*110. The method of claim 108, further including adding at least one member selected from the group consisting of a flavor ingredient, colorant, and oil to said beans.*

*111. The method of claim 108, wherein water is added to said remainder of said broth used for hydrating subsequent raw beans.*

*112. A method for producing a reconstitutable dehydrated bean product, comprising:*

*a. hydrating raw beans in a wetting liquid for an amount of time sufficient to obtain hydrated beans and a broth, said broth including bean solids dissolved from the raw beans being hydrated;*

*b. separating said hydrated beans from said broth;*

*c. adding a portion of said bean solids from step (a) to at least one of steps (d)-(g) in the method;*

*d. steam cooking said separated hydrated beans to obtain cooked beans;*

*e. producing a texturized bean composition with a desired consistency from said cooked beans;*

*f. depositing the texturized bean composition onto a moving conveyor; and*

*g. drying the texturized bean composition.*

*113. The method of claim 112, further including forming the dried bean composition into chunks.*

*114. The method of claim 112, further including adding at least one member selected from the group consisting of a flavor ingredient, colorant, and oil to said beans.*

* * * * *